(12) United States Patent
Pham Van et al.

(10) Patent No.: US 12,309,400 B2
(45) Date of Patent: May 20, 2025

(54) FIXED BIT DEPTH PROCESSING FOR CROSS-COMPONENT LINEAR MODEL (CCLM) MODE IN VIDEO CODING

(71) Applicant: QUALCOMM Incorporated, San Diego, CA (US)

(72) Inventors: Luong Pham Van, San Diego, CA (US); Dmytro Rusanovskyy, San Diego, CA (US); Wei-Jung Chien, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/486,728

(22) Filed: Sep. 27, 2021

(65) Prior Publication Data

US 2022/0103842 A1 Mar. 31, 2022

Related U.S. Application Data

(60) Provisional application No. 63/088,311, filed on Oct. 6, 2020, provisional application No. 63/085,964, filed on Sep. 30, 2020.

(51) Int. Cl.
*H04N 19/176* (2014.01)
*H04N 19/103* (2014.01)
(Continued)

(52) U.S. Cl.
CPC ......... *H04N 19/196* (2014.11); *H04N 19/103* (2014.11); *H04N 19/146* (2014.11); *H04N 19/176* (2014.11)

(58) Field of Classification Search
CPC .. H04N 19/196; H04N 19/103; H04N 19/146; H04N 19/176
See application file for complete search history.

(56) References Cited

U.S. PATENT DOCUMENTS 9,838,662 B2   12/2017   Zhang et al.
2008/0056352 A1*  3/2008   Kim ................. H04N 19/187
                                                         375/240.03

FOREIGN PATENT DOCUMENTS

CN    105264888 B       9/2018
JP    2006141016 A  *  6/2006  ............. H04N 19/12
(Continued)

OTHER PUBLICATIONS

Bross B., et al., "Versatile Video Coding (Draft 10)," Joint Video Experts Team (JVET) of ITU-T SG 16 WP 3 and ISO/IEC JTC 1/SC 29/WG 11, 131. MPEG Meeting, 19th Meeting: by teleconference, Jun. 22-Jul. 1, 2020, Jun. 29, 2020-Jul. 3, 2020, Online, (Motion Picture Expert Group or ISO/IEC JTC1/SC29/WG11), No. m54716, Sep. 4, 2020 (Sep. 4, 2020), XP030293002, 551 Pages, Retrieved from the Internet on Sep. 4, 2020.

(Continued)

*Primary Examiner* — Dave Czekaj
*Assistant Examiner* — Berteau Joisil
(74) *Attorney, Agent, or Firm* — Shumaker & Sieffert, P.A.

(57) ABSTRACT

A video decoder can be configured to determine that a first block of the video data is encoded in a cross component linear model (CCLM) mode; determine that the first block has a first bit depth; determine that a second block of the video data is encoded in the CCLM mode; determine that the second block has a second bit depth that is different than the first bit depth; and decode the first block and the second block in the CCLM mode using a fixed bit depth, wherein the fixed bit depth is different than at least one of the first bit depth or the second bit depth.

27 Claims, 10 Drawing Sheets

(51) Int. Cl.
*H04N 19/146* (2014.01)
*H04N 19/196* (2014.01)

(56) References Cited

FOREIGN PATENT DOCUMENTS

| TW | I705699 B | | 9/2020 | |
|---|---|---|---|---|
| TW | 202110181 | * | 3/2021 | ............. H04N 19/80 |
| WO | WO-2015131330 A1 | * | 9/2015 | ........... H04N 19/117 |
| WO | 2016057309 A1 | | 4/2016 | |
| WO | WO-2020169102 A1 | * | 8/2020 | ........... H04N 19/103 |

OTHER PUBLICATIONS

International Search Report and Written Opinion—PCT/US2021/052422—ISA/EPO—Jan. 25, 2022 14 Pages.
ITU-T H.265: "Series H: Audiovisual and Multimedia Systems, Infrastructure of Audiovisual Services—Coding of Moving Video, High Efficiency Video Coding," The International Telecommunication Union, Jun. 2019, 696 Pages.
ITU-T H.266: "Series H: Audiovisual and Multimedia Systems Infrastructure of Audiovisual Services—Coding of Moving Video," Versatile Video Coding, The International Telecommunication Union, Aug. 2020, 516 pages.
Rusanovskyy (Qualcomm) D., et al., "AHG8: On Constraining of Bit Depth of ALF Classifier and CCLM Derivation for Coding of High Bit-Depth Video Data," Joint Video Experts Team (JVET) of ITU-T SG 16 WP 3 and ISO/IEC JTC 1/SC 29, 23. JVET Meeting, Jul. 7, 2021-Jul. 16, 2021, Teleconference; (The Joint Video Exploration Team of ISO/IEC JTC1/SC29/WG11 and ITU-T SG.16), No. JVET-W0091, m57208, Jul. 1, 2021 (Jul. 1, 2021), XP030295996, Retrieved from the Internet on Jul. 1, 2021.
Wang M., et al., "CE3-1.5: CCLM Derived with Four Neighbouring Samples," 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0271-V1, Mar. 26, 2019 (Mar. 26, 2019), XP030204995, 3 Pages, Retrieved from the Internet: URL:http://phenix.int-evry.fr/jvet/doc_end_user/documents/14_Geneva/wg11/JVET-N0271-v4.zip JVET-N0271.docx [retrieved on Mar. 26, 2019].
Wang M., et al., "CE3-Related: Modified Linear Model Derivation for CCLM Modes," 13. JVET Meeting, Jan. 9, 2019-Jan. 18, 2019, Marrakech, (The Joint Video Exploration Team of ISO/IEC JTC1/SC29/WG11 and ITU-TSG.16 ), No. JVET-M0274, Jan. 3, 2019 (Jan. 3, 2019), XP030200428, 3 Pages, Retrieved from the Internet: URL: http://phenix.int-evry.fr/jvet/doc_end_user/documents/13_Marrakech/wg11/JVET-M0274-v1.zip JVET-M0274.docx retrieved on Jan. 3, 2019.
Taiwan Search Report—TW110136099—TIPO—Dec. 12, 2024.

* cited by examiner

FIXED BIT DEPTH PROCESSING FOR CROSS-COMPONENT LINEAR MODEL (CCLM) MODE IN VIDEO CODING

This application claims the benefit of U.S. Provisional Patent Application 63/085,964, filed 30 Sep. 2020 and U.S. Provisional Patent Application 63/088,311, filed 6 Oct. 2020, the entire content of each being hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

As will be described in more detail below, a video coder (e.g., a video encoder or video decoder) may predict a chroma component of a current block using a coding mode referred to as cross-component linear modelling (CCLM). For a current block coded in CCLM mode, the video coder derives parameters α and β based on reconstructed luma and chroma samples in neighboring blocks of the current block. The video coder then determines predictive chroma samples as a function of α, β, and already reconstructed luma samples. As will be explained in more detail below, CCLM mode can be calculation intensive and require the storage of large values, which can require significant hardware resources, particularly for hardware-based encoders and decoders. These hardware resources may become even greater for video data with higher bit depths, such as bit depths greater than 10-bits.

The techniques of this disclosure may reduce the hardware resources required for implementing CCLM mode, while still maintaining a desirable rate-distortion tradeoff for video coded in CCLM mode. For example, by decoding a block in the CCLM mode using a fixed bit depth that is different than the bit depth of the block, then a video coder may reduce the hardware resources required for CCLM mode. More specifically, by downsampling a luma block of the block to the fixed bit depth to determine an intermediate luma block and deriving CCLM parameters (e.g., α and β) based on the intermediate luma block, the video coder may reduce the hardware resources required for CCLM mode.

According to one example, a method of decoding video data, the method comprising determining that a first block of the video data is encoded in a cross component linear model (CCLM) mode; determining that the first block has a first bit depth; determining that a second block of the video data is encoded in the CCLM mode; determining that the second block has a second bit depth that is different than the first bit depth; and decoding the first block and the second block in the CCLM mode using a fixed bit depth, wherein the fixed bit depth is different than at least one of the first bit depth or the second bit depth.

According to another example, a device for decoding video data, the device comprising a memory configured to store the video data; and one or more processors coupled to the memory, implemented in circuitry, and configured to determine that a first block of the video data is encoded in a cross component linear model (CCLM) mode; determine that the first block has a first bit depth; determine that a second block of the video data is encoded in the CCLM mode; determine that the second block has a second bit depth that is different than the first bit depth; and decode the first block and the second block in the CCLM mode using a fixed bit depth, wherein the fixed bit depth is different than at least one of the first bit depth or the second bit depth.

According to another example, an apparatus for decoding video data, the apparatus comprising means for determining that a first block of the video data is encoded in a cross component linear model (CCLM) mode; means for determining that the first block has a first bit depth; means for determining that a second block of the video data is encoded in the CCLM mode; means for determining that the second block has a second bit depth that is different than the first bit depth; and means for decoding the first block and the second block in the CCLM mode using a fixed bit depth, wherein the fixed bit depth is different than at least one of the first bit depth or the second bit depth.

According to another example, a computer-readable storage medium storing instructions that when executed cause one or more processors to determine that a first block of the video data is coded in a cross component linear model (CCLM) mode; determine that the first block has a first bit depth; determine that a second block of the video data is coded in the CCLM mode; determine that the second block has a second bit depth that is different than the first bit depth; and decode the first block and the second block in the CCLM mode using a fixed bit depth, wherein the fixed bit depth is different than at least one of the first bit depth or the second bit depth.

The details of one or more examples are set forth in the accompanying drawings and the description below. Other features, objects, and advantages will be apparent from the description, drawings, and claims.

DETAILED DESCRIPTION

Figure 1:
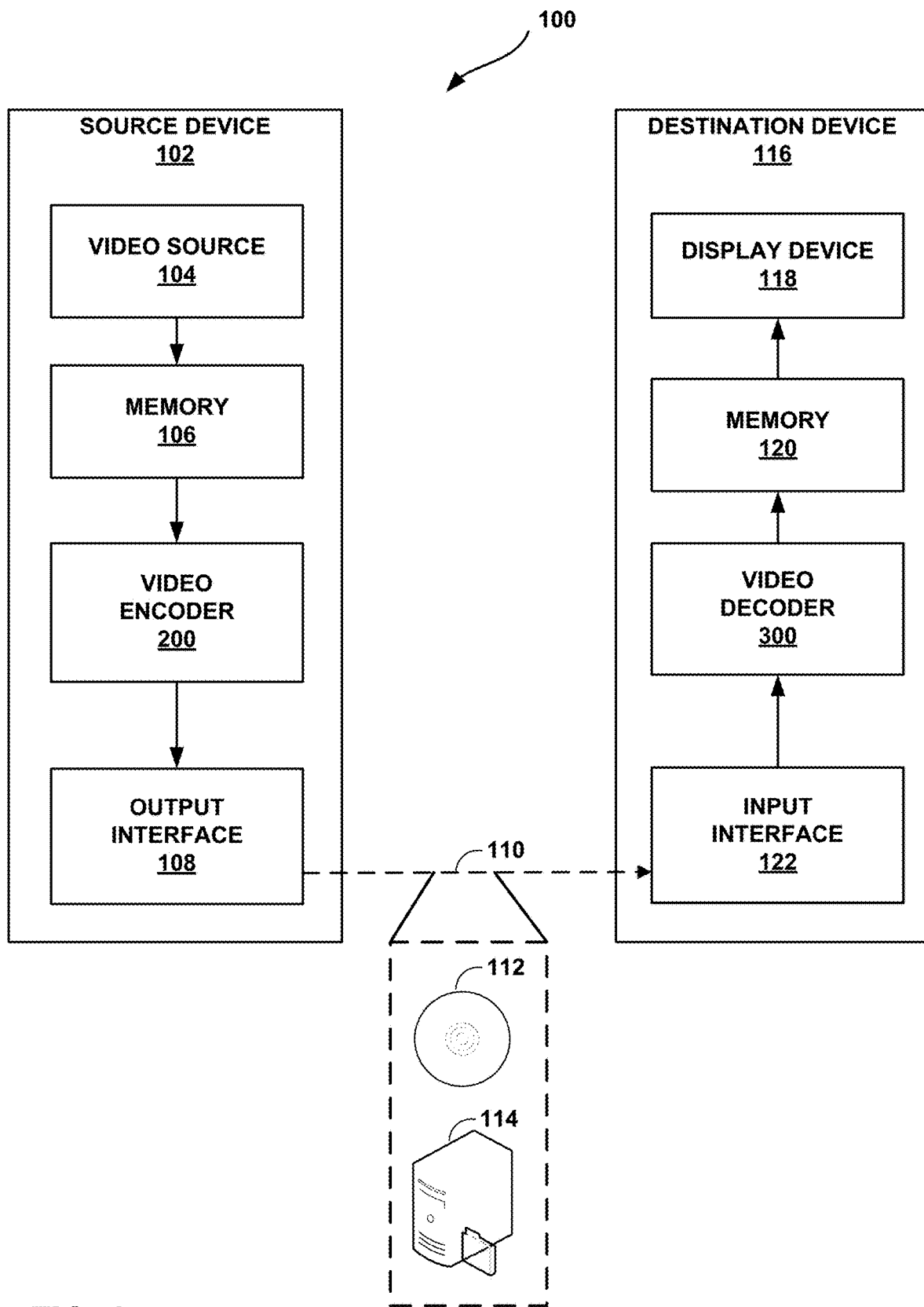
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

As will be described in more detail below, a video coder (e.g., a video encoder or video decoder) may predict a chroma component of a current block using a coding mode referred to as cross-component linear modelling (CCLM). For a current block coded in CCLM mode, the video coder derives parameters $\alpha$ and $\beta$ based on reconstructed luma and chroma samples in neighboring blocks of the current block. The video coder then determines predictive chroma samples as a function of $\alpha$, $\beta$, and already reconstructed luma samples. As will be explained in more detail below, CCLM can be calculation intensive and require the storage of large values, which can require significant hardware resources, particularly for hardware-based encoders and decoders. These hardware resources may become even greater for video with higher bit depths, such as bit depths greater than 10-bits.

The techniques of this disclosure may reduce the hardware resources required for implementing CCLM mode, while still maintaining a desirable rate-distortion tradeoff for video coded in CCLM mode. For example, by decoding a block in the CCLM mode using a fixed bit depth that is different than the bit depth of the block, then a video coder may reduce the hardware resources required for CCLM mode. More specifically, by downsampling a luma block of the block to the fixed bit depth to determine an intermediate luma block and deriving CCLM parameters (e.g., $\alpha$ and $\beta$) based on the intermediate luma block, the video coder may reduce the hardware resources required for CCLM mode.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, a video encoder typically performs video decoding (also called reconstruction) as part of the processes of determining how to encode video data. For example, a video encoder may decode a block in CCLM deblocking filtering on decoded video blocks in order to determine whether a certain encoding scheme produces a desirable rate-distortion tradeoff and also so that the video encoder can perform motion estimation using the same blocks available to a video decoder when the video decoder performs motion compensation.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for fixed bit depth processing in CCLM mode. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for fixed bit depth processing in CCLM mode. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a web site), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). VVC may provide a significant improvement in compression performance over the existing HEVC standard, aiding in deployment of higher-quality video services and emerging applications such as 360° omnidirectional immersive multimedia and high-dynamic-range (HDR) video. A draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 18$^{th}$ Meeting: by teleconference, 22 Jun.-1 Jul. 2020, JVET-S2001-v17 (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
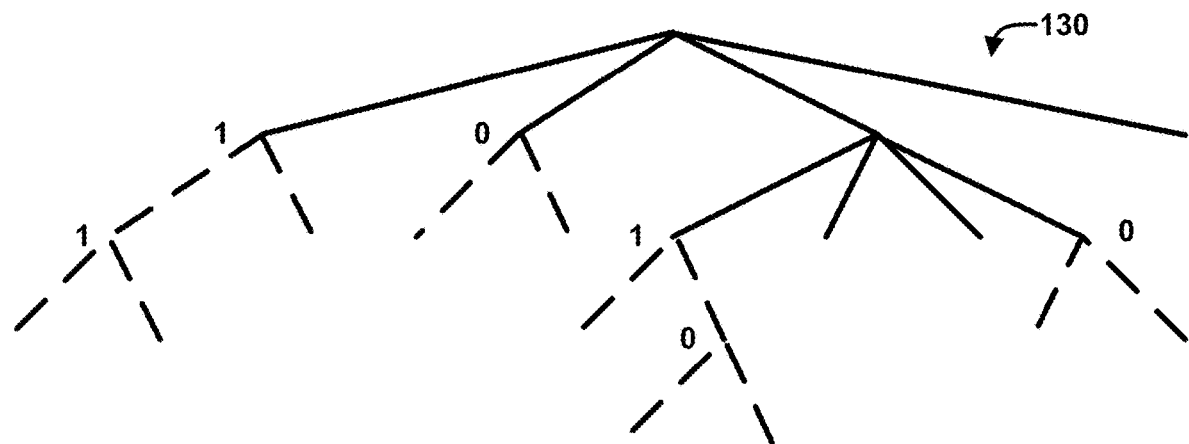
FIGS. 2A and 2B are conceptual diagrams illustrating an example quadtree binary tree (QTBT) structure, and a corresponding coding tree unit (CTU).
Figure 2B:
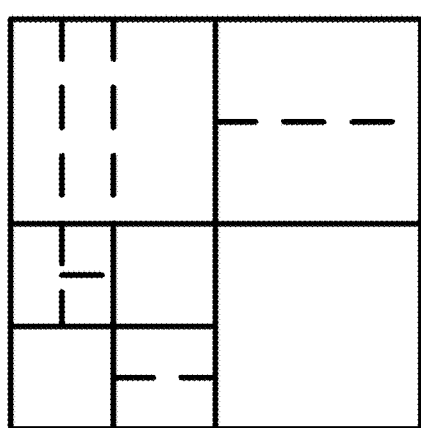

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

This disclosure describes techniques for using a fixed bit depth in the processing video data using CCLM mode. Although the cross-complement redundancy may be significantly reduced in a YCbCr color space, correlation between the three color components still exists. For 4:4:4, 4:2:2, or 4:2:0 color format data, CCLM mode may be used to code chroma components. As introduced above, using CCLM mode, video encoder 200 and video decoder 300 may be configured to predict a block for a chroma component based on a scaled version of the reconstructed luma block. That is, video encoder 200 and video decoder 300 may be configured to predict the chroma samples based on reconstructed luma samples of the same block by using a linear model, as follows:

$$\text{pred}_C(i,j) - \alpha \cdot \text{rec}_L(i,j) + \beta \quad (1)$$

where $\text{pred}_c(i,j)$ represents the prediction of chroma samples in a block (e.g., a CU), and $\text{rec}_L(i,j)$ represents the reconstructed luma samples of the same block. For 4:2:2 and 4:2:0 color formats, the reconstructed luma samples may be downsampled to the same size as the chroma block. Parameters $\alpha$ and $\beta$ may be derived from causal reconstructed samples around the current block. For a chroma block size of M×N, then i and j are within the ranges of [0, M] and [0, N], respectively.

Video encoder 200 and video decoder 300 may be configured to derive parameters $\alpha$ and $\beta$ in equation (1) by minimizing the regression error between the neighboring reconstructed luma and chroma samples around the current block, as follows:

$$E(\alpha, \beta) = \sum_i (y_i - (\alpha \cdot x_i + \beta))^2 \quad (2)$$

For example, video encoder 200 and video decoder 300 may be configured to derive the parameters $\alpha$ and $\beta$ as follows:

$$\alpha = \frac{I \Sigma x_i \cdot y_i - \Sigma x_i \cdot \Sigma y_i}{I \Sigma x_i \cdot x_i - \Sigma x_i \cdot \Sigma x_i} \quad (3)$$

$$\beta = (\Sigma y_i - \alpha \cdot \Sigma x_i) / I \quad (4)$$

where $x_i$ represents reconstructed, and possibly downsampled, luma reference samples; $y_i$ represents reconstructed Chroma reference samples; and I is an amount of the reference samples. For a target M×N chroma block, when both left and above causal samples are available, a total involved samples number (i.e., the "I" value above) is equal to M+N. When only left or above causal samples are available, a total involved samples number I is equal to N.

Figure 3:
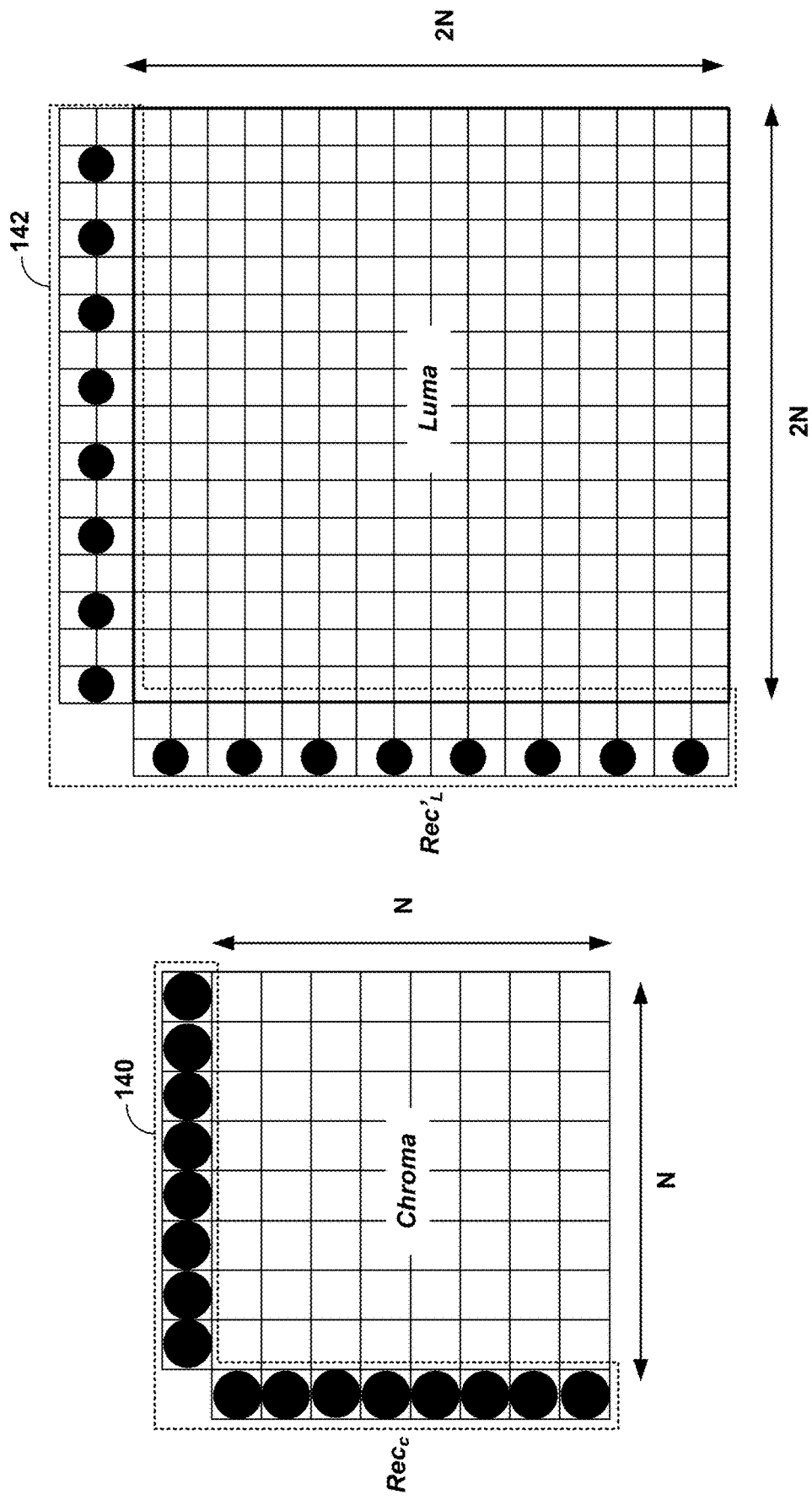
FIG. 3 shows an example of locations of the samples used for the derivation of $\alpha$ and $\beta$ for cross component linear model (CCLM) mode.

FIG. 3 shows an example of the location of the left and above neighboring samples and the sample of the current block used for derivation of the CCLM parameters (e.g., α and β parameters), which are used for CCLM prediction. As shown in FIG. 3, chroma neighboring samples 140 correspond to reconstructed chroma samples from a neighboring left block and from a neighboring above block. However, down-sampled luma neighboring samples 142 correspond to reconstructed luma samples that are down-sampled from reconstructed samples of a neighboring left block and from a neighboring above block.

Figure 4:
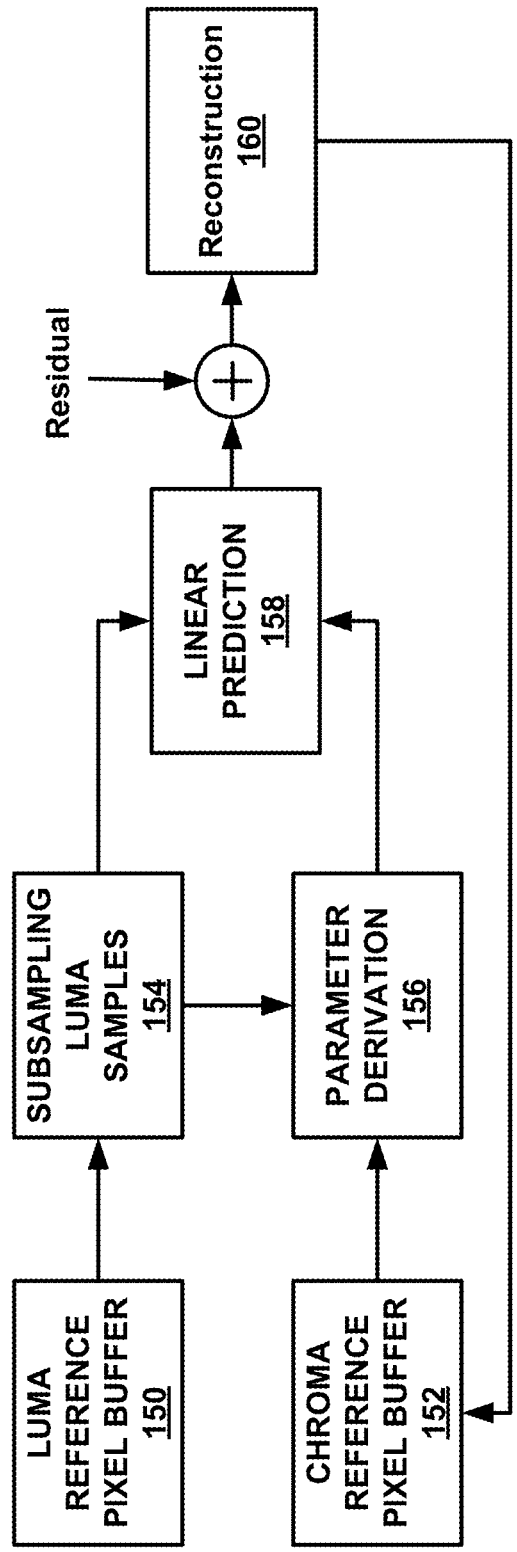
FIG. 4 shows an example decoding process for CCLM mode.

FIG. 4 shows an example decoding process for CCLM mode. In the example of FIG. 4, video decoder 300 stores luma reference samples in a luma reference pixel buffer (150) and chroma reference samples in a chroma reference pixel buffer (152). Video decoder 300 subsamples the luma reference samples (154) and performs parameter derivation (156) based on the subsampled luma samples. Video decoder 300 then performs linear prediction based on the subsampled luma samples and the derived parameters (158) to derive a predictive chroma block. Video decoder 300 then adds the predictive chroma block to residual data to determine a reconstructed chroma block (160). Video decoder 300 stores the reconstructed chroma block in the chroma reference pixel buffer so that the samples of the reconstructed chroma block can be used for coding future blocks of the video data.

When CLLM prediction mode is applied, the following steps may be invoked (as presented in FIG. 4). Video decoder 300 may downsample the neighboring luma samples, if needed, such as for 4:2:2 or 4:2:0 color format or access to neighboring samples in the case of 4:4:4. Video decoder 300 may derive the linear model parameters (i.e., α and β) from neighboring luma and chroma samples. Video decoder 300 may then downsample the current luma block, if needed, and derive the prediction block for the chroma block from the luma block, or downsampled luma block, and linear parameters.

In VVC Draft 10, only four points of the neighboring chroma samples are used in the linear model in CCLM mode. The four selected points are based on the width and height of the blocks and the CCLM mode.

Figure 5:
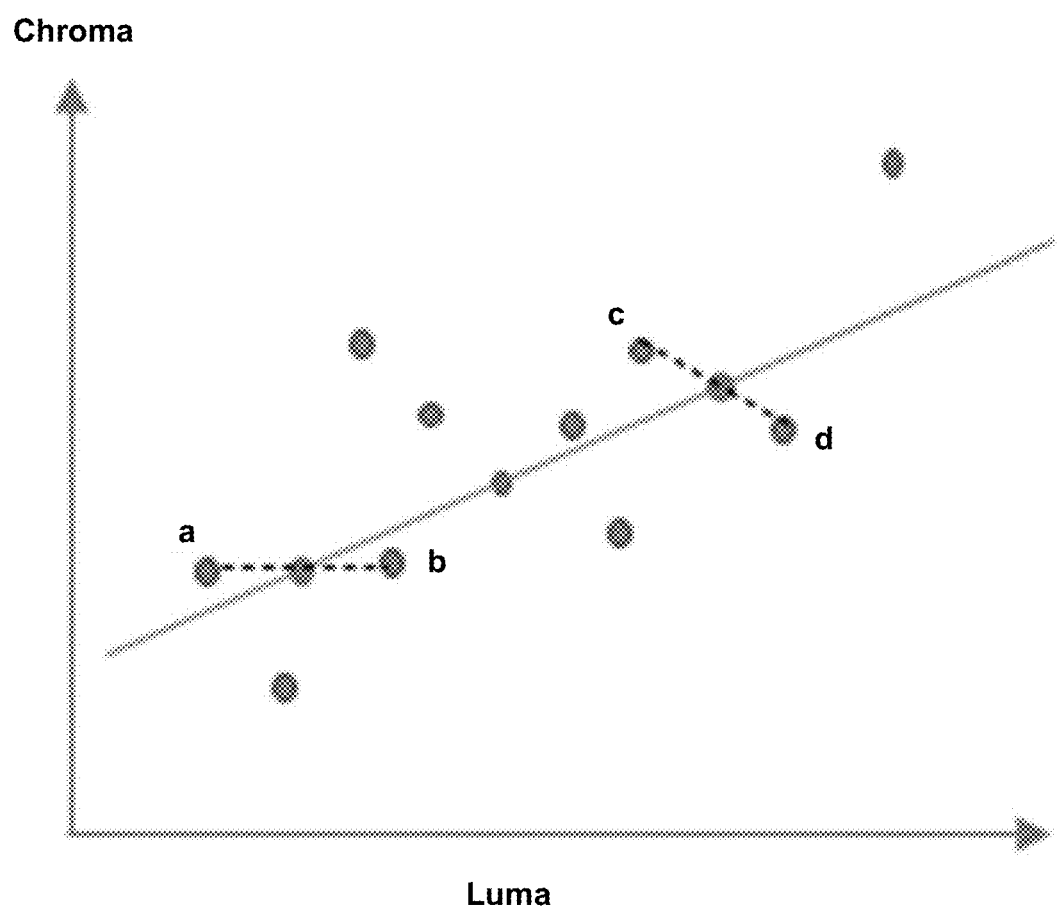
FIG. 5 shows an example of a model for CCLM mode.

In the example of FIG. 5, four points (a, b, c, d) are selected. The model is represented by the straight line between a middle of two lower intensity points (a, b) and a middle of two higher intensity points (c, d).

The design of CCLM mode in VVC Draft 10 has some potential problems. In the design of CCLM mode in VVC Draft 10, the derivation of the CCLM parameters and the application of the linear model for chroma prediction in CCLM mode are performed based on the bit depth of the original video (or the bit depth of the reconstructed samples). It may be desirable for the design of the CCLM process to support higher bit depth profiles, but such support can lead increased hardware cost. The techniques of this disclosure described techniques for performing CCLM processing at a fixed bit depth in a manner that may reduce the computational complexity, and hardware costs associated with the CCLM mode, while still preserving a desirable rate-distortion tradeoff for blocks coded in the CCLM mode.

This disclosure describes fixed bit depth processing for the derivation of the CCLM parameters and the application of the linear model for chroma prediction in a CCLM mode, which may address some of the problems introduced above. That is, for blocks coded in a CCLM mode, video encoder 200 and video decoder 300 may be configured to decode the blocks using a fixed bit depth that may be difference than the bit depth of the blocks.

In one example of this disclosure, the CCLM model derivation may be processed at a bit depth of 10, as in the main profile 10 of VVC. The related section of VVC Draft 10 below may accordingly be modified as follows, with text in between the markers <ADD> and </ADD> representing added text and text in between the markers <DEL> and </DEL> representing deleted text. The same markings will also be used to show additions and deletions elsewhere in this disclosure.

---

8.4.5.2.14 Specification of INTRA_LT_CCLM, INTRA_LCCLM and INTRA_T_CCLM intra prediction mode

---

Inputs to this process are:
    the intra prediction mode predModeIntra,
    a sample location ( xTbC, yTbC ) of the top-left sample of the current transform block relative to the top-left sample of the current picture,
    a variable nTbW specifying the transform block width,
    a variable nTbH specifying the transform block height,
    a variable cIdx specifying the colour component of the current block,
    neighbouring chroma samples p[ x ][ y ], with x = −1, y = −1..2 * nTbH − 1 and
    x = 0..2 * nTbW − 1, y = −1.

Output of this process are predicted samples predSamples[ x ][ y ], with
x = 0..nTbW − 1, y = 0..nTbH − 1.
<ADD>
Variable shift1 is set equal to (BitDepth − 10)
Variable offset1 is set equal to 1 << (shift1 − 1)
</ADD>
The current luma location ( xTbY, yTbY ) is derived as follows:
    ( xTbY, yTbY ) = ( xTbC << ( SubWidthC − 1 ), yTbC << ( SubHeightC − 1 )
    )  (349)
The variables availL and availT are derived as follows:
    The derivation process for neighbouring block availability as specified in subclause 6.4.4
    is invoked with the current luma location ( xCurr, yCurr ) set equal to ( xTbY, yTbY ),
    the neighbouring luma location ( xTbY − 1, yTbY), checkPredModeY set equal to
    FALSE, and cIdx as inputs, and the output is assigned to availL.
    The derivation process for neighbouring block availability as specified in subclause 6.4.4
    is invoked with the current luma location ( xCurr, yCurr ) set equal to ( xTbY, yTbY ),
    the neighbouring luma location ( xTbY, yTbY − 1 ), checkPredModeY set equal to
    FALSE, and cIdx as inputs, and the output is assigned to availT.

8.4.5.2.14 Specification of INTRA_LT_CCLM, INTRA_LCCLM and INTRA_T_CCLM intra prediction mode The number of available top-right neighbouring chroma samples numTopRight is derived as follows:
  The variable numTopRight is set equal to 0 and availTR is set equal to TRUE.
  When predModeIntra is equal to INTRA_T_CCLM, the following applies for
  x = nTbW..2 * nTbW − 1 until availTR is equal to FALSE:
    The derivation process for neighbouring block availability as specified in
    subclause 6.4.4 is invoked with the current luma location ( xCurr, yCurr ) set equal to
    ( xTbY, yTbY ) the neighbouring luma location
    ( xTbY + x * SubWidthC, yTbY − 1 ), checkPredModeY set equal to FALSE, and
    cIdx as inputs, and the output is assigned to availTR.
    When availTR is equal to TRUE, numTopRight is incremented by one.
The number of available left-below neighbouring chroma samples numLeftBelow is derived as follows:
  The variable numLeftBelow is set equal to 0 and availLB is set equal to TRUE.
  When predModeIntra is equal to INTRA_L_CCLM, the following applies for
  y = nTbH..2 * nTbH − 1 until availLB is equal to FALSE:
    The derivation process for neighbouring block availability as specified in
    subclause 6.4.4 is invoked with the current luma location ( xCurr, yCurr ) set equal to
    ( xTbY, yTbY ), the neighbouring luma location
    ( xTbY − 1, yTbY + y * SubHeightC ), checkPredModeY set equal to FALSE, and
    cIdx as inputs, and the output is assigned to availLB.
    When availLB is equal to TRUE, numLeftBelow is incremented by one.
The number of available neighbouring chroma samples on the top and top-right numSampT and the number of available neighbouring chroma samples on the left and left-below numSampL are derived as follows:
  If predModeIntra is equal to INTRA_LT_CCLM, the following applies:
    numSampT = availT ? nTbW : 0                                                        (350)
    numSampL = availL ? nTbH : 0                                                        (351)
  Otherwise, the following applies:
    numSampT = ( availT && predModeIntra = = INTRA_T_CCLM ) ?
            ( nTbW +Min( numTopRight, nTbH ) ) : 0
            (352)
    numSampL = ( availL && predModeIntra = = INTRA_L_CCLM ) ? ( nTbH +
            Min( numLeftBelow, nTbW ) ) : 0                                             (353)
The variable bCTUboundary is derived as follows:
  bCTUboundary = ( ( yTbY & ( CtbSizeY − 1 ) ) = = 0 ) ? TRUE : FALSE                   (354)
The variable cntN and array pickPosN with N being replaced by L and T, are derived as follows:
  The variable numIs4N is derived as follows:
    numIs4N = ( ( availT && availL && predModeIntra = = INTRA_LT_CCLM )
    ? 0 : 1 )                                                                           (355)
  The variable startPosN is set equal to numSampN >> ( 2 + numIs4N ).
  The variable pickStepN is set equal to Max( 1, numSampN >> ( 1 + numIs4N ) ).
  If availN is equal to TRUE and predModeIntra is equal to INTRA_LT_CCLM or
  INTRA_N_CCLM, the following assignments are made:
        cntN is set equal to Min( numSampN, ( 1 + numIs4N ) << 1 ).
        pickPosN[ pos ] is set equal to (startPosN + pos * pickStepN), with
        pos = 0.. cntN − 1.
  Otherwise, cntN is set equal to 0.
The prediction samples predSamples[ x ][ y ] with x = 0..nTbW − 1, y = 0..nTbH − 1 are derived as follows:
  If both numSampL and numSampT are equal to 0, the following applies:
    predSamples[ x ][ y ] = 1 << (<DEL>BitDepth</DEL><ADD>10</ADD> − 1 )
            (356)
  Otherwise, the following ordered steps apply:
1.  The collocated luma samples pY[ x ][ y ] with x = 0..nTbW * SubWidthC − 1,
    y= 0..nTbH * SubHeightC − 1 are set equal to the reconstructed luma samples prior to
    the deblocking filter process at the locations ( xTbY + x, yTbY + y ).
2.  The neighbouring luma samples pY[ x ][ y ] are derived as follows:
        When availL is equal to TRUE, the neighbouring luma samples pY[ x ][ y ] with
        x = −3..−1, y = ( availT ? −1 : 0 )..SubHeightC * Max( nTbH, numSampL ) − 1,
        are set equal to the reconstructed luma samples prior to the deblocking filter process
        at the locations ( xTbY + x , yTbY +y ).
        When availT is equal to FALSE, the neighbouring luma samples pY[ x ][ y ] with
        x = −2..SubWidthC * nTbW − 1, y = −2..−1, are set equal to the luma samples
        pY[ x ][ 0 ].
        When availT is equal to TRUE, the neighbouring luma samples pY[ x ][ y ] with
        x = ( availL ? −1 : 0 )..SubWidthC * Max( nTbW, numSampT ) − 1, y = −3..−1,
        are set equal to the reconstructed luma samples prior to the deblocking filter process
        at the locations ( xTbY+ x, yTbY + y ).
        When availL is equal to FALSE, the neighbouring luma samples pY[ x ][ y ] with
        x = −1, y = −2..SubHeightC * nTbH − 1, are set equal to the reconstructed luma
        samples pY[ 0 ][ y ].

8.4.5.2.14 Specification of INTRA_LT_CCLM, INTRA_LCCLM and INTRA_T_CCLM intra prediction mode 3. The down-sampled collocated luma samples pDsY[ x ][ y ] with x = 0..nTbW − 1, y = 0..nTbH − 1 are derived as follows:
    If both SubWidthC and SubHeightC are equal to 1, the following applies:
    <DEL>pDsY[ x ][ y ] = pY[ x ][ y ]    (357)</DEL>
    <ADD>pDsY[ x ][ y ] = (pY[ x ][ y ] + offset1) >> shift1 (357)</ADD>
    Otherwise, if SubHeightC is equal to 1, the following applies:
    pDsY[ x ][ y ] = ( pY[ SubWidthC * x − 1 ][ y ] +
        2 * pY[ SubWidthC * x ][ y ] +    (358)
        <DEL>pY[ SubWidthC * x + 1 ][ y ] + 2 ) >> 2</DEL>
        <ADD>pY[ SubWidthC * x + 1 ][ y ] + (1 << (1 + shift1))) >> (2 + shift1)</ADD>
    Otherwise (SubHeightC is not equal to 1), the following applies:
    If sps_chroma_vertical_collocated_flag is equal to 1, the following applies:
    pDsY[ x ][ y ] = ( pY[ SubWidthC * x ][ SubHeightC * y − 1 ] +
        pY[ SubWidthC * x − 1 ][ SubHeightC * y ] +
        4 * pY[ SubWidthC * x ][ SubHeightC * y ] +    (359)
        pY[ SubWidthC * x + 1 ][ SubHeightC * y ] +
        <DEL>pY[ SubWidthC * x ][ SubHeightC * y + 1 ] + 4 ) >> 3 </DEL>
        <ADD>pY[ SubWidthC * x ][ SubHeightC * y + 1 ] + (1 << (2 + shift1))) >> ( 3 + shift1) </ADD>
    Otherwise (sps_chroma_vertical_collocated_flag is equal to 0), the following applies:
    pDsY[ x ][ y ] = ( pY[ SubWidthC * x − 1 ][ SubHeightC * y ] +
        pY[ SubWidthC * x − 1 ][ SubHeightC * y + 1 ] +
        2 * pY[ SubWidthC * x ][ SubHeightC * y ] +    (360)
        2 * pY[ SubWidthC * x ][ SubHeightC * y + 1 ] +
        pY[ SubWidthC * x + 1 ][ SubHeightC * y ] +
        <DEL>pY[ SubWidthC * x + 1 ][ SubHeightC * y + 1 ] + 4) >> 3 </DEL>
        <ADD>pY[ SubWidthC * x + 1 ][ SubHeightC * y + 1 ] + (1<< (2 + shift1))) >> (3+ shift1) </ADD>
4. When numSampT is greater than 0, the selected neighbouring top chroma samples pSelC[ idx ] are set equal to p[ pickPosT[ idx ] ][ −1 ] with idx = 0..cntT − 1, and the down-sampled neighbouring top luma samples pSelDsY[ idx ] with idx = 0..cntT − 1 are specified as follows:
    The variable x is set equal to pickPosT[ idx ].
    If both SubWidthC and SubHeightC are equal to 1, the following applies:
    <DEL>pSelDsY[ idx ] = pY[ x ][ −1 ]    (361)</DEL>
    <ADD>pSelDsY[ idx ] = ( pY[ x ][ −1 ] + offset1 ) >>shift1 (361)</ADD>
    Otherwise, the following applies:
    If SubHeightC is not equal to 1 and bCTUboundary is equal to FALSE, the following applies:
    If sps_chroma_vertical_collocated_flag is equal to 1, the following applies:
    pSelDsY[ idx ] = ( pY[ SubWidthC * x ][ −3 ] +
        pY[ SubWidthC * x − 1 ][ −2 ] +
        4 * pY[ SubWidthC * x ][ −2 ] +    (362)
        pY[ SubWidthC * x + 1 ][ −2 ] +
        <DEL>pY[ SubWidthC * x ][ −1 ] + 4 ) >> 3 </DEL>
        <ADD>pY[ SubWidthC * x ][ −1 ] + (1<<(2 + shift1)) ) >> ( 3 + shift1) </ADD>
    Otherwise (sps_chroma_vertical_collocated_flag is equal to 0), the following applies:
    pSelDsY[ idx ] = ( pY[ SubWidthC * x − 1 ][ −1 ] +
        pY[ SubWidthC * x − 1 ][ −2 ] +
        2* pY[ SubWidthC * x ][ −1 ] +    (363)
        2 * pY[ SubWidthC * x ][ −2 ] +
        pY[ SubWidthC * x + 1 ][ −1 ] +
        <DEL>pY[ SubWidthC * x + 1 ][ −2 ] + 4 ) >> 3 </DEL>
        <ADD>pY[ SubWidthC * x + 1 ][ −2 ] + (1<<(2 + shift1))) >> ( 3 + shift1) </ADD>
    Otherwise (SubHeightC is equal to 1 or bCTUboundary is equal to TRUE), the following applies:
    pSelDsY[ idx ] = ( pY[ SubWidthC * x − 1 ][ −1 ] +
        2 * pY[ SubWidthC * x ][ −1 ] +    (364)
        <DEL>pY[ SubWidthC * x + 1 ][ −1 ] + 2) >> 2</DEL>
        <ADD>pY[ SubWidthC * x + 1 ][ −1 ] + (1<<(1 + shift1))) >> ( 2 + shift1) </ADD>

-continued 8.4.5.2.14 Specification of INTRA_LT_CCLM, INTRA_LCCLM
and INTRA_T_CCLM intra prediction mode 5. When numSampL is greater than 0, the selected neighbouring left chroma samples
pSelC[ idx ] are set equal to p[ −1 ][ pickPosL[ idx − cntT ] ] with
idx = cntT..cntT + cntL − 1, and the selected down-sampled neighbouring left luma
samples pSelDsY[ idx ] with idx = cntT..cntT + cntL − 1 are derived as follows:
    The variable y is set equal to pickPosL[ idx − cntT ].
    If both SubWidthC and SubHeightC are equal to 1, the following applies:
        <DEL>pSelDsY[ idx ] = pY[ −1 ][ y ]    (365) </DEL>
        <ADD>pSelDsY[ idx ] = (pY[ −1 ][ y ] + offset1)>>shift1    (365)
        </ADD>
    Otherwise, if SubHeightC is equal to 1, the following applies:
        pSelDsY[ idx ] = ( pY[ −1 − SubWidthC ][ y ] +
            2 * pY[ −SubWidthC ][ y ] +    (366)
            <DEL>pY[ 1 − SubWidthC ][ y ] + 2 ) >> 2 </DEL>
            <ADD>pY[ 1 − SubWidthC ][ y ] + (1<<(1 +
        shift1))) >> ( 2 + shift1) </ADD>
    Otherwise the following applies:
        If sps_chroma_vertical_collocated_flag is equal to 1, the following applies:
            pSelDsY[ idx ] = ( pY[ −SubWidthC ][ SubHeightC * y − 1 ] +
                pY[ −1 − SubWidthC ][ SubHeightC * y ] +
            4 * pY[ −SubWidthC ][ SubHeightC * y ] +    (367)
            pY[ 1 − SubWidthC ][ SubHeightC * y ] +
            <DEL>pY[ −SubWidthC ][ SubHeightC * y + 1 ] + 4 ) >>
        3<DEL>
        <ADD>pY[ −SubWidthC ][ SubHeightC * y + 1 ] + (1<<(2 +
        shift1))4 ) >> ( 3 + shift1) </ADD>
        Otherwise (sps_chroma_vertical_collocated_flag is equal to 0), the following
        applies:
            pSelDsY[ idx ] = ( pY[ −1 − SubWidthC ][ SubHeightC * y ] +
                pY[ −1 − SubWidthC ][ SubHeightC * y + 1 ] +
                2 * pY[ −SubWidthC ][ SubHeightC * y ] +    (368)
                2 * pY[ −SubWidthC ][ SubHeightC * y + 1 ] +
                pY[ 1 − SubWidthC ][ SubHeightC * y ] +
            <DEL>pY[ 1 − SubWidthC][ SubHeightC * y + 1 ] + 4 ) >> 3
        </DEL>
            <ADD>pY[ 1 − SubWidthC][ SubHeightC * y + 1 ] + (1
        <<(2 + shift1))) >> ( 3 + shift1) </ADD>

6. The variables minY, maxY, minC and maxC are derived as follows:
    When cntT + cntL is equal to 2, pSelComp[ 3 ] is set equal to pSelComp[ 0 ],
    pSelComp[ 2 ] is set equal to pSelComp[ 1 ], pSelComp[ 0 ] is set equal to
    pSelComp[ 1 ], and pSelComp[ 1 ] is set equal to pSelComp[ 3 ], with Comp being
    replaced by DsY and C.
    The arrays minGrpIdx and maxGrpIdx are derived as follows:
        minGrpIdx[ 0 ] = 0    (369)
        minGrpIdx[ 1 ] = 2    (370)
        maxGrpIdx[ 0 ] = 1    (371)
        maxGrpIdx[ 1 ] = 3    (372)
    When pSelDsY[ minGrpIdx[ 0 ] ] is greater than pSelDsY[ minGrpIdx[ 1 ] ],
    minGrpIdx[ 0 ] and minGrpIdx[ 1 ] are swapped as follows:
        ( minGrpIdx[ 0 ], minGrpIdx[ 1 ] ) = Swap( minGrpIdx[ 0 ], minGrpIdx[ 1 ] )
        (373)
    When pSelDsY[ maxGrpIdx[ 0 ] ] is greater than pSelDsY[ maxGrpIdx[ 1 ] ],
    maxGrpIdx[ 0 ] and maxGrpIdx[ 1 ] are swapped as follows:
        ( maxGrpIdx[ 0 ], maxGrpIdx[ 1 ] ) = Swap( maxGrpIdx[ 0 ], maxGrpIdx[ 1 ]
        )    (374)
    When pSelDsY[ minGrpIdx[ 0 ] ] is greater than pSelDsY[ maxGrpIdx[ 1 ] ],
    arrays minGrpIdx and maxGrpIdx are swapped as follows:
        ( minGrpIdx, maxGrpIdx ) = Swap( minGrpIdx, maxGrpIdx )    (375)
    When pSelDsY[ minGrpIdx[ 1 ] ] is greater than pSelDsY[ maxGrpIdx[ 0 ] ],
    minGrpIdx[ 1 ] and maxGrpIdx[ 0 ] are swapped as follows:
        ( minGrpIdx[ 1 ], maxGrpIdx[ 0 ] ) = Swap( minGrpIdx[ 1 ], maxGrpIdx[ 0 ]
        )    (376)
    The variables maxY, maxC, minY and minC are derived as follows:
        maxY = ( pSelDsY[ maxGrpIdx[ 0 ] ] + pSelDsY[ maxGrpIdx[ 1 ] ] +
        1 ) >> 1    (377)
        <DEL>maxC = (pSelC[ maxGrpIdx[ 0 ] ]) + pSelC[ maxGrpIdx[ 1 ] ] +
        1 ) >> 1    (378) </DEL>
        <ADD>maxC = ( ((pSelC[ maxGrpIdx[ 0 ] ] +offset1) >>shift1) +
        ((pSelC[ maxGrpIdx[ 1 ] ] + offset1)>>shift1) + 1 ) >> 1    (378) </ADD>
        minY = ( pSelDsY[ minGrpIdx[ 0 ] ] + pSelDsY[ minGrpIdx[ 1 ] ] +
        1 ) >> 1    (379)
        <DEL>minC = (pSelC[ minGrpIdx[ 0 ] ] + pSelC[ minGrpIdx[ 1 ] ] +
        1 ) >> 1    (380) </DEL>
        <ADD>minC = ( ((pSelC[ minGrpIdx[ 0 ] ] + offset1)>>shift1) +
        ((pSelC[ minGrpIdx[ 1 ] ] + offset1)>>shift1) + 1 ) >> 1    (380) </ADD>

-continued 8.4.5.2.14 Specification of INTRA_LT_CCLM, INTRA_L_CCLM and INTRA_T_CCLM intra prediction mode 7. The variables a, b, and k are derived as follows:
   The variable diff is derived as follows:
       diff = maxY − minY     (381)
   If diff is not equal to 0, the following applies.
       diffC = maxC − minC     (382)
       x = Floor( Log2( diff ) )     (383)
       normDiff = ( ( diff << 4 ) >> x ) & 15     (384)
       x += ( normDiff != 0 ) ? 1 : 0     (385)
       y = Abs( diffC ) > 0 ? Floor( Log2( Abs ( diffC ) ) ) + 1 : 0     (386)
       a = ( diffC * ( divSigTable[ normDiff ] | 8 ) + $2^{y-1}$ ) >> y
       k = ( ( 3 + x − y ) < 1 ) ? 1 : 3 + x − y     (388)
       a = ( ( 3 + x − y ) < 1 ) ? Sign( a ) * 15 : a     (389)
       b = minC − ( ( a * minY ) >> k )     (390)
   where divSigTable[ ] is specified as follows:
       divSigTable[ ] = { 0, 7, 6, 5, 5, 4, 4, 3, 3, 2, 2, 1, 1, 1, 1, 0 }     (391)
   Otherwise (diff is equal to 0), the following applies:
       k = 0     (392)
       a = 0     (393)
       b = minC     (394)
8. The prediction samples predSamples[ x ][ y ] with x = 0..nTbW − 1, y = 0..nTbH − 1 are derived as follows:
   <DEL>
   predSamples[ x ][ y ] = Clip1( ( ( pDsY[ x ][ y ] * a ) >> k ) + b)     (395)
   </DEL>
   <ADD>
   predSamples[ x ][ y ] = Clip1(( ( ( pDsY[ x ][ y ] * a ) >> k ) + b) <<shift1)     (395)
   </ADD>

NOTE
This process uses sps_chroma_vertical_collocated_flag. However, in order to simplify implementation, it does not use sps_chroma_horizontal_collocated_flag.

In another example, the CCLM mode is processed at a defined bit depth "bd." The related section of VVC Draft 10 may accordingly be modified as follows, with text in between the markers <ADD> and </ADD> representing added text and text in between the markers <DEL> and </DEL> representing deleted text.

8.4.5.2.14 Specification of INTRA_LT_CCLM, INTRA_L_CCLM and INTRA_T_CCLM intra prediction mode Inputs to this process are:
    the intra prediction mode predModeIntra,
    a sample location ( xTbC, yTbC ) of the top-left sample of the current transform block relative to the top-left sample of the current picture,
    a variable nTbW specifying the transform block width,
    a variable nTbH specifying the transform block height,
    a variable cIdx specifying the colour component of the current block,
    neighbouring chroma samples p[ x ][ y ], with x = −1, y = −1..2 * nTbH − 1 and x = 0.. 2 * nTbW − 1, y = −1.
Output of this process are predicted samples predSamples[ x ][ y ], with x = 0..nTbW − 1, y = 0..nTbH − 1.
<ADD>
Variable shift1 is set equal to (BitDepth − bd)
Variable offset1 is set equal to 1 << (shift1 − 1)
</ADD>
The current luma location ( xTbY, yTbY ) is derived as follows:
    ( xTbY, yTbY ) = ( xTbC << ( SubWidthC − 1 ), yTbC << ( SubHeightC − 1 ) )     (349)
The variables availL and availT are derived as follows:
    The derivation process for neighbouring block availability as specified in subclause 6.4.4 is invoked with the current luma location ( xCurr, yCurr ) set equal to ( xTbY, yTbY ), the neighbouring luma location ( xTbY − 1, yTbY ), checkPredModeY set equal to FALSE, and cIdx as inputs, and the output is assigned to availL.
    The derivation process for neighbouring block availability as specified in subclause 6.4.4 is invoked with the current luma location ( xCurr, yCurr ) set equal to ( xTbY, yTbY ), the neighbouring luma location ( xTbY, yTbY − 1 ), checkPredModeY set equal to FALSE, and cIdx as inputs, and the output is assigned to availT.

8.4.5.2.14 Specification of INTRA_LT_CCLM, INTRA_L_CCLM and INTRA_T_CCLM intra prediction mode The number of available top-right neighbouring chroma samples numTopRight is derived as follows:
    The variable numTopRight is set equal to 0 and availTR is set equal to TRUE.
    When predModeIntra is equal to INTRA_T_CCLM, the following applies for
    x = nTbW..2 * nTbW − 1 until availTR is equal to FALSE:
        The derivation process for neighbouring block availability as specified in
        subclause 6.4.4 is invoked with the current luma location ( xCurr, yCurr ) set equal to
        ( xTbY, yTbY ) the neighbouring luma location
        ( xTbY + x * SubWidthC, yTbY − 1 ), checkPredModeY set equal to FALSE, and
        cIdx as inputs, and the output is assigned to availTR.
    When availTR is equal to TRUE, numTopRight is incremented by one.
The number of available left-below neighbouring chroma samples numLeftBelow is derived as follows:
    The variable numLeftBelow is set equal to 0 and availLB is set equal to TRUE.
    When predModeIntra is equal to INTRA_L_CCLM, the following applies for
    y = nTbH..2 * nTbH − 1 until availLB is equal to FALSE:
        The derivation process for neighbouring block availability as specified in
        subclause 6.4.4 is invoked with the current luma location ( xCurr, yCurr ) set equal to
        ( xTbY, yTbY ), the neighbouring luma location
        ( xTbY − 1, yTbY + y * SubHeightC ), checkPredModeY set equal to FALSE, and
        cIdx as inputs, and the output is assigned to availLB.
    When availLB is equal to TRUE, numLeftBelow is incremented by one.
The number of available neighbouring chroma samples on the top and top-right numSampT and the number of available neighbouring chroma samples on the left and left-below numSampL are derived as follows:
    If predModeIntra is equal to INTRA_LT_CCLM, the following applies:
        numSampT = availT ? nTbW : 0    (350)
        numSampL = availL ? nTbH : 0    (351)
    Otherwise, the following applies:
        numSampT = ( availT && predModeIntra = = INTRA_T_CCLM ) ?
            ( nTbW +Min( numTopRight, nTbH ) ) : 0
        (352)
        numSampL = ( availL && predModeIntra = = INTRA_L_CCLM ) ? ( nTbH +
            Min( numLeftBelow, nTbW ) ) : 0    (353)
The variable bCTUboundary is derived as follows:
    bCTUboundary = ( ( yTbY & ( CtbSizeY − 1 ) ) = = 0 ) ? TRUE : FALSE    (354)
The variable cntN and array pickPosN with N being replaced by L and T, are derived as follows:
    The variable numIs4N is derived as follows:
        numIs4N = ( ( availT && availL && predModeIntra = = INTRA_LT_CCLM ) ?
            0 : 1 ) (355)
    The variable startPosN is set equal to numSampN >> ( 2 + numIs4N ).
    The variable pickStepN is set equal to Max( 1, numSampN >> ( 1 + numIs4N ) ).
    If availN is equal to TRUE and predModeIntra is equal to INTRA_LT_CCLM or
    INTRA_N_CCLM, the following assignments are made:
        cntN is set equal to Min( numSampN, ( 1 + numIs4N ) << 1 ).
        pickPosN[ pos ] is set equal to (startPosN + pos * pickStepN), with
        pos = 0.. cntN − 1.
    Otherwise, cntN is set equal to 0.
The prediction samples predSamples[ x ][ y ] with x = 0..nTbW − 1, y = 0..nTbH − 1 are derived as follows:
    If both numSampL and numSampT are equal to 0, the following applies:
        predSamples[ x ][ y ] = 1 << ( <DEL>BitDepth</DEL><ADD>bd</ADD> − 1 )
        (356)
    Otherwise, the following ordered steps apply:
1.    The collocated luma samples pY[ x ][ y ] with x = 0..nTbW * SubWidthC − 1,
    y= 0..nTbH * SubHeightC − 1 are set equal to the reconstructed luma samples prior to
    the deblocking filter process at the locations ( xTbY + x, yTbY + y ).
2.    The neighbouring luma samples pY[ x ][ y ] are derived as follows:
        When availL is equal to TRUE, the neighbouring luma samples pY[ x ][ y ] with
        x = −3..−1, y = ( availT ? −1 : 0 )..SubHeightC * Max( nTbH, numSampL ) − 1,
        are set equal to the reconstructed luma samples prior to the deblocking filter process
        at the locations ( xTbY + x , yTbY +y ).
        When availT is equal to FALSE, the neighbouring luma samples pY[ x ][ y ] with
        x = −2..SubWidthC * nTbW − 1, y = −2..−1, are set equal to the luma samples
        pY[ x ][ 0 ].
        When availT is equal to TRUE, the neighbouring luma samples pY[ x ][ y ] with
        x = ( availL ? −1 : 0 )..SubWidthC * Max( nTbW, numSampT ) − 1, y = −3..−1,
        are set equal to the reconstructed luma samples prior to the deblocking filter process
        at the locations ( xTbY+ x, yTbY + y ).
        When availL is equal to FALSE, the neighbouring luma samples pY[ x ][ y ] with
        x = −1, y = −2..SubHeightC * nTbH − 1, are set equal to the reconstructed luma
        samples pY[ 0 ][ y ].

-continued 8.4.5.2.14 Specification of INTRA_LT_CCLM, INTRA_L_CCLM and INTRA_T_CCLM intra prediction mode 3. The down-sampled collocated luma samples pDsY[ x ][ y ] with x = 0..nTbW − 1, y = 0..nTbH − 1 are derived as follows:
   If both SubWidthC and SubHeightC are equal to 1, the following applies:
   <DEL>pDsY[ x ][ y ] = pY[ x ][ y ]</DEL> (357)
   <ADD>pDsY[ x ][ y ] = (pY[ x ][ y ] + offset1) >> shift1 (357)</ADD>
   Otherwise, if SubHeightC is equal to 1, the following applies:
   pDsY[ x ][ y ] = ( pY[ SubWidthC * x − 1 ][ y ] +
      2 * pY[ SubWidthC * x ][ y ] +
      <del>pY[ SubWidthC * x + 1 ][ y ] + 2 ) >> 2</del> (358)
      <add>pY[ SubWidthC * x + 1 ][ y ] + (1 << (1 + shift1))) >> (2 + shift1)</add>
   Otherwise (SubHeightC is not equal to 1), the following applies:
      If sps_chroma_vertical_collocated_flag is equal to 1, the following applies:
      pDsY[ x ][ y ] = ( pY[ SubWidthC * x ][ SubHeightC * y − 1 ] +
         pY[ SubWidthC * x − 1 ][ SubHeightC * y ] +
         4 * pY[ SubWidthC * x ][ SubHeightC * y ] + (359)
         pY[ SubWidthC * x + 1 ][ SubHeightC * y ] +
         <DEL>pY[ SubWidthC * x ][ SubHeightC * y + 1 ] + 4 ) >> 3
         </DEL>
         <ADD>pY[ SubWidthC * x ][ SubHeightC * y + 1 ] + (1 << (2 + shift1))4 ) >> ( 3 + shift1)</ADD>
      Otherwise (sps_chroma_vertical_collocated_flag is equal to 0), the following applies:
      pDsY[ x ][ y ] = ( pY[ SubWidthC * x − 1 ][ SubHeightC * y ] +
         pY[ SubWidthC * x − 1 ][ SubHeightC * y + 1 ] +
         2 * pY[ SubWidthC * x ][ SubHeightC * y ] + (360)
         2 * pY[ SubWidthC * x ][ SubHeightC * y + 1 ] +
         pY[ SubWidthC * x + 1 ][ SubHeightC * y ] +
         <DEL>pY[ SubWidthC * x ][ SubHeightC * y + 1 ] + 4 ) >> 3
         </DEL>
         <ADD>pY[ SubWidthC * x ][ SubHeightC * y + 1 ] + (1 << (2 + shift1))4 ) >> ( 3 + shift1)</ADD>

4. When numSampT is greater than 0, the selected neighbouring top chroma samples pSelC[ idx ] are set equal to p[ pickPosT[ idx ] ][ −1 ] with idx = 0..cntT − 1, and the down-sampled neighbouring top luma samples pSelDsY[ idx ] with idx = 0..cntT − 1 are specified as follows:
   The variable x is set equal to pickPosT[ idx ].
   If both SubWidthC and SubHeightC are equal to 1, the following applies:
   <del>pSelDsY[ idx ] = pY[ x ][ −1 ] (361)</del>
   <add>pSelDsY[ idx ] = ( pY[ x ][ −1 ] + offset1 ) >>shift1(361)</add>
   Otherwise, the following applies:
      If SubHeightC is not equal to 1 and bCTUboundary is equal to FALSE, the following applies:
         If sps_chroma_vertical_collocated_flag is equal to 1, the following applies:
         pSelDsY[ idx ] = ( pY[ SubWidthC * x ][ −3 ] +
            pY[ SubWidthC * x − 1 ][ −2 ] +
            4 * pY[ SubWidthC * x ][ −2 ] + (362)
            pY[ SubWidthC * x + 1 ][ −2 ] +
            <DEL>pY[ SubWidthC * x ][ −1 ] + 4 ) >> 3 </DEL>
            <ADD>pY[ SubWidthC * x ][ −1 ] + (1<<(2 + shift1))4 ) >> ( 3 + shift1)</ADD>
         Otherwise (sps_chroma_vertical_collocated_flag is equal to 0), the following applies:
         pSelDsY[ idx ] = ( pY[ SubWidthC * x − 1 ][ −1 ] +
            pY[ SubWidthC * x − 1 ][ −2 ] +
            2* pY[ SubWidthC * x ][ −1 ] + (363)
            2 * pY[ SubWidthC * x ][ −2 ] +
            pY[ SubWidthC * x + 1 ][ −1 ] +
            <del>pY[ SubWidthC * x + 1 ][ −2 ] + 4 ) >> 3 </del>
            <add>pY[ SubWidthC * x + 1 ][ −2 ] + (1<<(2 + shift1))4 ) >> ( 3 + shift1)</add>
      Otherwise (SubHeightC is equal to 1 or bCTUboundary is equal to TRUE), the following applies:
      pSelDsY[ idx ] = ( pY[ SubWidthC * x − 1 ][ −1 ] +
         2 * pY[ SubWidthC * x ][ −1 ] + (364)
         <del>pY[ SubWidthC * x + 1 ][ −1 ] + 2 ) >> 2
         </del>
         <add>pY[ SubWidthC * x + 1 ][ −1 ] + (1<<(1 + shift1))) >> ( 2 + shift1)</add>

5. When numSampL is greater than 0, the selected neighbouring left chroma samples pSelC[ idx ] are set equal to p[ −1 ][ pickPosL[ idx − cntT ] ] with idx = cntT..cntT + cntL − 1, and the selected down-sampled neighbouring left luma samples pSelDsY[ idx ] with idx = cntT..cntT + cntL − 1 are derived as follows:

-continued 8.4.5.2.14 Specification of INTRA_LT_CCLM, INTRA_L_CCLM and INTRA_T_CCLM intra prediction mode The variable y is set equal to pickPosL[ idx − cntT ].
If both SubWidthC and SubHeightC are equal to 1, the following applies:
<del>pSelDsY[ idx ] = pY[ −1 ][ y ] (365)</del>
<add>pSelDsY[ idx ] = (pY[ −1 ][ y ] + offset1)>>shift1 (365)</add>
Otherwise, if SubHeightC is equal to 1, the following applies:
pSelDsY[ idx ] = ( pY[ −1 − SubWidthC ][ y ] +
2 * pY[ −SubWidthC ][ y ] + (366)
<del>pY[ 1 − SubWidthC ][ y ] + 2 ) >> 2</del>
<add>pY[ 1 − SubWidthC ][ y ] + (1<<(1 + shift1)) ) >> ( 2 + shift1)</add>
Otherwise the following applies:
If sps_chroma_vertical_collocated_flag is equal to 1, the following applies:
pSelDsY[ idx ] = ( pY[ −SubWidthC ][ SubHeightC * y − 1 ] +
pY[ −1 − SubWidthC ][ SubHeightC * y ] +
4 * pY[ −SubWidthC ][ SubHeightC * y ] + (367)
pY[ 1 − SubWidthC ][ SubHeightC * y ] +
<add>pY[ −SubWidthC ][ SubHeightC * y + 1 ] + (1<<(2 + shift1))4 ) >> ( 3 + shift1)</add>
<del>pY[ −SubWidthC ][ SubHeightC * y + 1 ] + 4 ) >> 3 </del>
Otherwise (sps_chroma_vertical_collocated_flag is equal to 0), the following applies:
pSelDsY[ idx ] = ( pY[ −1 − SubWidthC ][ SubHeightC * y ] +
pY[ −1 − SubWidthC ][ SubHeightC * y + 1 ] +
2 * pY[ −SubWidthC ][ SubHeightC * y ] + (368)
2 * pY[ −SubWidthC ][ SubHeightC * y + 1 ] +
pY[ 1 − SubWidthC ][ SubHeightC * y ] +
<add>pY[ 1 − SubWidthC][ SubHeightC * y + 1 ] + (1<<(2 + shift1))4 ) >> ( 3 + shift1)</add>
<del>pY[ 1 − SubWidthC][ SubHeightC * y + 1 ] + 4 ) >> 3</del>

6. The variables minY, maxY, minC and maxC are derived as follows:
When cntT + cntL is equal to 2, pSelComp[ 3 ] is set equal to pSelComp[ 0 ], pSelComp[ 2 ] is set equal to pSelComp[ 1 ], pSelComp[ 0 ] is set equal to pSelComp[ 1 ], and pSelComp[ 1 ] is set equal to pSelComp[ 3 ], with Comp being replaced by DsY and C.
The arrays minGrpIdx and maxGrpIdx are derived as follows:
minGrpIdx[ 0 ] = 0 (369)
minGrpIdx[ 1 ] = 2 (370)
maxGrpIdx[ 0 ] = 1 (371)
maxGrpIdx[ 1 ] = 3 (372)
When pSelDsY[ minGrpIdx[ 0 ] ] is greater than pSelDsY[ minGrpIdx[ 1 ] ], minGrpIdx[ 0 ] and minGrpIdx[ 1 ] are swapped as follows:
( minGrpIdx[ 0 ], minGrpIdx[ 1 ] ) = Swap( minGrpIdx[ 0 ], minGrpIdx[ 1 ] ) (373)
When pSelDsY[ maxGrpIdx[ 0 ] ] is greater than pSelDsY[ maxGrpIdx[ 1 ] ], maxGrpIdx[ 0 ] and maxGrpIdx[ 1 ] are swapped as follows:
( maxGrpIdx[ 0 ], maxGrpIdx[ 1 ] ) = Swap( maxGrpIdx[ 0 ], maxGrpIdx[ 1 ] ) (374)
When pSelDsY[ minGrpIdx[ 0 ] ] is greater than pSelDsY[ maxGrpIdx[ 1 ] ], arrays minGrpIdx and maxGrpIdx are swapped as follows:
( minGrpIdx, maxGrpIdx ) = Swap( minGrpIdx, maxGrpIdx ) (375)
When pSelDsY[ minGrpIdx[ 1 ] ] is greater than pSelDsY[ maxGrpIdx[ 0 ] ], minGrpIdx[ 1 ] and maxGrpIdx[ 0 ] are swapped as follows:
( minGrpIdx[ 1 ], maxGrpIdx[ 0 ] ) = Swap( minGrpIdx[ 1 ], maxGrpIdx[ 0 ] ) (376)
The variables maxY, maxC, minY and minC are derived as follows:
maxY = ( pSelDsY[ maxGrpIdx[ 0 ] ] + pSelDsY[ maxGrpIdx[ 1 ] ] + 1 ) >> 1 (377)
<add>maxC = ( ((pSelC[ maxGrpIdx[ 0 ] ] +offset1) >>shift1) + ((pSelC[ maxGrpIdx[ 1 ] ] + offset1)>>shift1) + 1 ) >> 1 (378)</add>
<del>maxC = ( pSelC[ maxGrpIdx[ 0 ] ] + pSelC[ maxGrpIdx[ 1 ] ] + 1 ) >> 1 (378)</del>
minY = ( pSelDsY[ minGrpIdx[ 0 ] ] + pSelDsY[ minGrpIdx[ 1 ] ] + 1 ) >> 1 (379)
<add>minC = ( ((pSelC[ minGrpIdx[ 0 ] ] + offset1)>>shift1) + ((pSelC[ minGrpIdx[ 1 ] ] + offset1)>>shift1) + 1 ) >> 1 (380)</add>
<del>minC = (pSelC[ minGrpIdx[ 0 ] ] + pSelC[ minGrpIdx[ 1 ] ] + 1 ) >> 1 (380)</del>

7. The variables a, b, and k are derived as follows:
The variable diff is derived as follows:
diff = maxY − minY (381)
If diff is not equal to 0, the following applies:
diffC = maxC − minC (382)
x = Floor( Log2( diff ) ) (383)

8.4.5.2.14 Specification of INTRA_LT_CCLM, INTRA_L_CCLM and INTRA_T_CCLM intra prediction mode

```
        normDiff = ( ( diff << 4 ) >> x ) & 15                            (384)
        x += ( normDiff != 0 ) ? 1 : 0                                    (385)
        y = Abs( diffC ) > 0 ? Floor( Log2( Abs ( diffC ) ) ) + 1 : 0     (386)
        a = ( diffC * ( divSigTable[ normDiff ] | 8 ) + 2^(y - 1) ) >> y  (387)
        k = ( ( 3 + x - y ) < 1 ) ? 1 : 3 + x - y                        (388)
        a = ( ( 3 + x - y ) < 1 ) ? Sign( a ) * 15 : a                   (389)
        b = minC - ( ( a * minY ) >> k )                                  (390)
    where divSigTable[ ] is specified as follows:
        divSigTable[ ] = { 0, 7, 6, 5, 5, 4, 4, 3, 3, 2, 2, 1, 1, 1, 1, 0 } (391)
    Otherwise (diff is equal to 0), the following applies:
        k = 0                                                             (392)
        a = 0                                                             (393)
        b = minC                                                          (394)
8.  The prediction samples predSamples[ x ][ y ] with x = 0..nTbW - 1, y = 0.. nTbH - 1
    are derived as follows:
    <add>predSamples[ x ][ y ] = Clip1(( ( ( pDsY[ x ][ y ] * a ) >> k ) + b) <<shift1 )
                                                                          (395)</add>
    <del>predSamples[ x ][ y ] = Clip1(( ( pDsY[ x ][ y ] * a ) >> k ) + b)    (395)</del>
```

NOTE

This process uses sps_chroma_vertical_collocated_flag. However, in order to simplify implementation, it does not use sps_chroma_horizontal_collocated_flag.

In another example, video encoder 200 and video decoder 300 may be configured to convert the neighboring luma samples to the defined bit depth (e.g., 10 as in the main profile 10 of VVC) before applying the down-sampling process. In this case, the output of the linear model may need to be converted to the input bit depth.

In yet another example, a left shift utilized to increase bit depth of the output sample to the input bit depth may be expressed through linear model parameters, by adjusting linear model parameters a and b, with the variables a and b generally representing a manner for implementing the $\alpha$ and $\beta$ parameters introduced above. An example of such implementation is shown below.

a1=function(a,b, inputBitdepth, operationalBitdepth);
b1=function(a,b, inputBitdepth, operationalBitdepth);
k1=function(a,b, inputBitdepth, operationalBitdepth);
where operationalBitdepth can be equal to 10 or to some other integer value specified by bd, and function( ) represents the derivation process of linear approximation for converting the input linear model parameters a and b to the output bit depth. Video encoder 200 and video decoder 300 may be configured to derive the prediction samples predSamples[x][y] with x=0 . . . nTbW−1, y=0 . . . nTbH−1 as follows:

$$predSamples[x][y]=Clip1(((pDsY[x][y]*a1)>>k1)+b1) \quad (395)$$

In some examples, bit depth constraints may be introduced to different elements of the CCLM design. In one example, bit depth constraints to the luma samples (e.g., in a form right shift, or other) may be integrated to the subsampling filters. In yet another example, the luma sample constraints may be applied prior to the subsampling filters, such that the filters would operate on the constrained bit depth as well.

In yet another example, bit depth constraints introduced to the luma and chroma samples, prior to the processing module, e.g. CCLM, can differ in implementation and may be defined as follows:

Luma sample bit depth constraints will now be described. Video encoder 200 and video decoder 300 may be configured to implement a bit depth constraint on the luma samples y[j,i] (with i and j spatial indexes within a block) that are used in the CCLM derivation as follows:

$$Y[x][y]=y[x][y]>>shift.$$

In other examples, video encoder 200 and video decoder 300 may be configured to implement a constraint applied on the result of luma subsampling as follows:

$$pSelDsY[0 \ldots 3]=pSelDsY[0 \ldots 3]>>shift.$$

where a bit depth constraining shift may be derived from inputBitdepth and operationalBitdepth, e.g. as $$shift=inputBitdepth-operationalBitdepth$$

or derived by taking into account a current value of the luma sample, such that shift=function(y[x][y], inputBitdepth,operationalBitDepth), or syntax elements, signalled in the bitstream.

Chroma sample bit depth constraints will now be described. Video encoder 200 and video decoder 300 may be configured to impose a bit depth constraint on chroma samples chy[x][y] that participate in the CCLM parameters derivation as follows:

$$ChY[x][y]=(a*chy[x][y]>>aShift-b)>>bShift.$$

$$ChY[x][y]=clip3(0,maxOperational,ChY[x][y])a$$

where linear scaling parameters a, aShift, b, and bShift are derived as a function of inputBitdepth, opertaionBitDepth, as well as a value of the luma sample associated with current chromaSample chy[x][y] and maxOperational value would be a maximum value allowed under the current opertaional bit depth constraint, e.g, (1<<operationalBitdepth)−1.

In some examples, the variables may be defined as follows:
a=1, aShift=0, bShift=0, maxOpertional=(1<<operationalBitdepth)−1 and b is being derived as difference between mid point of input (1<<(inputBd−1)) and operational (1<<(operationalBd−1)) for CCLM dynamical ranges.

An example of modifications to the VVC Draft 10 text for such implementations is shown below.

8.4.5.2.14 Specification of INTRA_LT_CCLM, INTRA_L_CCLM and INTRA_T_CCLM intra prediction mode Inputs to this process are:
the intra prediction mode predModeIntra,
a sample location ( xTbC, yTbC ) of the top-left sample of the current transform block
relative to the top-left sample of the current picture,
a variable nTbW specifying the transform block width,
a variable nTbH specifying the transform block height,
a variable cIdx specifying the colour component of the current block,
neighbouring chroma samples p[ x ][ y ], with x = −1, y = −1..2 * nTbH − 1 and x = 0..
2 * nTbW − 1, y = −1.

Output of this process are predicted samples predSamples[ x ][ y ], with
x = 0..nTbW − 1, y = 0..nTbH − 1.

<ADD>
Variable shift1 is set equal to max ( 0, (BitDepth − 10).
If shift1 is larger than 0, variable offsetCh is set equal to ( ( 1 << ( BitDepth − 1 ) ) −
( 1 << 9). Otherwise, variable offsetCh are set equal to 0.
</ADD>

The current luma location ( xTbY, yTbY ) is derived as follows:
  ( xTbY, yTbY ) = ( xTbC << ( SubWidthC − 1 ), yTbC << ( SubHeightC − 1 ) )
   (349)

The variables availL and availT are derived as follows:
The derivation process for neighbouring block availability as specified in subclause 6.4.4
is invoked with the current luma location ( xCurr, yCurr ) set equal to ( xTbY, yTbY ), the
neighbouring luma location ( xTbY − 1, yTbY ), checkPredModeY set equal to FALSE,
and cIdx as inputs, and the output is assigned to availL.
The derivation process for neighbouring block availability as specified in subclause 6.4.4
is invoked with the current luma location ( xCurr, yCurr ) set equal to ( xTbY, yTbY ), the
neighbouring luma location ( xTbY, yTbY − 1 ), checkPredModeY set equal to FALSE,
and cIdx as inputs, and the output is assigned to availT.

The number of available top-right neighbouring chroma samples numTopRight is
derived as follows:
The variable numTopRight is set equal to 0 and availTR is set equal to TRUE.
When predModeIntra is equal to INTRA_T_CCLM, the following applies for
x = nTbW..2 * nTbW − 1 until availTR is equal to FALSE:
 The derivation process for neighbouring block availability as specified in
 subclause 6.4.4 is invoked with the current luma location ( xCurr, yCurr ) set equal to
 ( xTbY , yTbY ) the neighbouring luma location
 ( xTbY + x * SubWidthC, yTbY − 1 ), checkPredModeY set equal to FALSE, and
 cIdx as inputs, and the output is assigned to availTR.
 When availTR is equal to TRUE, numTopRight is incremented by one.

The number of available left-below neighbouring chroma samples numLeftBelow is
derived as follows:
The variable numLeftBelow is set equal to 0 and availLB is set equal to TRUE.
When predModeIntra is equal to INTRA_L_CCLM, the following applies for
y = nTbH..2 * nTbH − 1 until availLB is equal to FALSE:
 The derivation process for neighbouring block availability as specified in
 subclause 6.4.4 is invoked with the current luma location ( xCurr, yCurr ) set equal to
 ( xTbY , yTbY ), the neighbouring luma location
 ( xTbY − 1, yTbY + y * SubHeightC ), checkPredModeY set equal to FALSE, and
 cIdx as inputs, and the output is assigned to availLB.
 When availLB is equal to TRUE, numLeftBelow is incremented by one.

The number of available neighbouring chroma samples on the top and top-right
numSampT and the number of available neighbouring chroma samples on the left and left-
below numSampL are derived as follows:
If predModeIntra is equal to INTRA_LT_CCLM, the following applies:
   numSampT = availT ? nTbW : 0    (350)
   numSampL = availL ? nTbH : 0    (351)
Otherwise, the following applies:
   numSampT = ( availT && predModeIntra = = INTRA_T_CCLM ) ?
    ( nTbW +Min( numTopRight, nTbH ) ) : 0
  (352)
   numSampL =
( availL && predModeIntra = = INTRA_L_CCLM ) ? ( nTbH +
   Min( numLeftBelow, nTbW ) ) : 0   (353)

The variable bCTUboundary is derived as follows:
   bCTUboundary = ( ( yTbY & ( CtbSizeY − 1 ) ) = = 0 ) ? TRUE : FALSE
 (354)

The variable cntN and array pickPosN with N being replaced by L and T, are derived
as follows:
The variable numIs4N is derived as follows:
   numIs4N = ( ( availT && availL && predModeIntra = = INTRA_LT_C
 CLM ) ? 0 : 1 )    (355)
The variable startPosN is set equal to numSampN >> ( 2 + numIs4N ).
The variable pickStepN is set equal to Max( 1, numSampN >> ( 1 + numIs4N ) ).
If availN is equal to TRUE and predModeIntra is equal to INTRA_LT_CCLM or
INTRA_N_CCLM, the following assignments are made:
  cntN is set equal to Min( numSampN, ( 1 + numIs4N ) << 1 ).
  pickPosN[ pos ] is set equal to (startPosN + pos * pickStepN), with
   pos = 0.. cntN − 1.
Otherwise, cntN is set equal to 0.

-continued 8.4.5.2.14 Specification of INTRA_LT_CCLM, INTRA_L_CCLM and INTRA_T_CCLM intra prediction mode The prediction samples predSamples[ x ][ y ] with x = 0..nTbW − 1, y = 0..nTbH − 1
are derived as follows:
    If both numSampL and numSampT are equal to 0, the following applies:
        predSamples[ x ][ y ] = 1 << ( BitDepth− 1 )    (356)
    Otherwise, the following ordered steps apply:

1. The collocated luma samples pY[ x ][ y ] with x = 0..nTbW * SubWidthC − 1,
   y= 0..nTbH * SubHeightC − 1 are set equal to the reconstructed luma samples prior to
   the deblocking filter process at the locations ( xTbY + x, yTbY + y ).
2. The neighbouring luma samples pY[ x ][ y ] are derived as follows:
       When availL is equal to TRUE, the neighbouring luma samples pY[ x ][ y ] with
       x = −3..−1, y = ( availT ? −1 : 0 )..SubHeightC * Max( nTbH, numSampL ) − 1,
       are set equal to the reconstructed luma samples prior to the deblocking filter process
       at the locations ( xTbY + x , yTbY +y ).
       When availT is equal to FALSE, the neighbouring luma samples pY[ x ][ y ] with
       x = −2..SubWidthC * nTbW − 1, y = −2..−1, are set equal to the luma samples
       pY[ x ][ 0 ].
       When availT is equal to TRUE, the neighbouring luma samples pY[ x ][ y ] with
       x = ( availL ? −1 : 0 )..SubWidthC * Max( nTbW, numSampT ) − 1, y = −3..−1,
       are set equal to the reconstructed luma samples prior to the deblocking filter process
       at the locations (xTbY+ x, yTbY + y ).
       When availL is equal to FALSE, the neighbouring luma samples pY[ x ][ y ] with
       x = −1, y = −2..SubHeightC * nTbH − 1, are set equal to the reconstructed luma
       samples pY[ 0 ][ y ].
3. The down-sampled collocated luma samples pDsY[ x ][ y ] with
   x = 0..nTbW − 1, y = 0..nTbH − 1 are derived as follows:
       <add>If both SubWidthC and SubHeightC are equal to 1, the following applies:
           pDsY[ x ][ y ] = pY[ x ][ y ] >> shift1    (357)</add>
       <del>If both SubWidthC and SubHeightC are equal to 1, the following applies:
           pDsY[ x ][ y ] = pY[ x ][ y ]    (357)</del>
       Otherwise, if SubHeightC is equal to 1, the following applies:
           pDsY[ x ][ y ] = ( pY[ SubWidthC * x − 1 ][ y ] +
               2 * pY[ SubWidthC * x ][ y ] +    (358)
               <add>pY[ SubWidthC * x + 1 ][ y ] + 2 ) >> (2 +
       shift1)</add>
               <del>pY[ SubWidthC * x + 1 ][ y ] + 2 ) >> 2</del>
       Otherwise (SubHeightC is not equal to 1), the following applies:
           If sps_chroma_vertical_collocated_flag is equal to 1, the following applies:
               pDsY[ x ][ y ] = ( pY[ SubWidthC * x ][ SubHeightC * y − 1 ]
           +
               pY[ SubWidthC * x − 1 ][ SubHeightC * y ] +
               4 * pY[ SubWidthC * x ][ SubHeightC * y ] +    (359)
               pY[ SubWidthC * x + 1 ][ SubHeightC * y ] +
           <add>pY[ SubWidthC * x ][ SubHeightC * y + 1 ] + 4 ) >> ( 3 +
       shift1)</add>
               <del>pY[ SubWidthC * x ][ SubHeightC * y + 1 ] + 4 ) >
       > 3</del>
           Otherwise (sps_chroma_vertical_collocated_flag is equal to 0), the following
           applies:
               pDsY[ x ][ y ] = ( pY[ SubWidthC * x − 1 ][ SubHeightC * y ]
           +
               pY[ SubWidthC * x − 1 ][ SubHeightC * y + 1 ] +
               2 * pY[ SubWidthC * x ][ SubHeightC * y ] +    (360)
               2 * pY[ SubWidthC * x ][ SubHeightC * y + 1 ] +
               pY[ SubWidthC * x + 1 ][ SubHeightC * y ] +
           <add> pY[ SubWidthC * x + 1 ][ SubHeightC * y + 1 ] + 4) >> (3+
       shift1)</add>
               <del>
               pY[ SubWidthC * x + 1 ][ SubHeightC * y + 1 ] + 4) >>
       3</del>
4. When numSampT is greater than 0, the selected neighbouring top chroma samples
   pSelC[ idx ] are set equal to <add>clip3( 0, 1023, p[ pickPosT[ idx ] ][ −1 ] − offsetCh
   )</add> with idx = 0..cntT − 1, and the down-sampled neighbouring top luma samples
   pSelDsY[ idx ] with idx = 0..cntT − 1 are specified as follows:
       The variable x is set equal to pickPosT[ idx ].
       If both SubWidthC and SubHeightC are equal to 1, the following applies:
           pSelDsY[ idx ] = pY[ x ][ −1 ] <add> >>shift1</add>    (361)
       Otherwise, the following applies:
           If SubHeightC is not equal to 1 and bCTUboundary is equal to FALSE, the
           following applies:
               If sps_chroma_vertical_collocated_flag is equal to 1, the following
               applies:
                   pSelDsY[ idx ] = ( pY[ SubWidthC * x ][ −3 ] +
                         pY[ SubWidthC * x − 1 ][ −2 ] +
                         4 * pY[ SubWidthC * x ][ −2 ] +    (362)
                         pY[ SubWidthC * x + 1 ][ −2 ] +
                   <add>pY[ SubWidthC * x ][ −1 ] + 4 ) >> ( 3 +
       shift1)</add>

8.4.5.2.14 Specification of INTRA_LT_CCLM, INTRA_L_CCLM and INTRA_T_CCLM intra prediction mode <del>pY[ SubWidthC * x ][ −1 ] + 4 ) >> 3</del>
    Otherwise (sps_chroma_vertical_collocated_flag is equal to 0), the
     following applies:

$$pSelDsY[\ idx\ ] = (\ pY[\ SubWidthC * x - 1\ ][\ -1\ ] +$$
$$pY[\ SubWidthC * x - 1\ ][\ -2\ ] +$$
$$2 * pY[\ SubWidthC * x\ ][\ -1\ ] +$$
$$2 * pY[\ SubWidthC * x\ ][\ -2\ ] +$$
$$pY[\ SubWidthC * x + 1\ ][\ -1\ ] +$$

(363)

<add>pY[ SubWidthC * x + 1 ][ −2 ] + 4 ) >> ( 3 + shift1)</add>
        <del>pY[ SubWidthC * x + 1 ][ −2 ] + 4 ) >> 3</del>
    Otherwise (SubHeightC is equal to 1 or bCTUboundary is equal to TRUE), the
     following applies:

$$pSelDsY[\ idx\ ] = (\ pY[\ SubWidthC * x - 1\ ][\ -1\ ] +$$
$$2 * pY[\ SubWidthC * x\ ][\ -1\ ] +$$

(364)

<add>pY[ SubWidthC * x + 1 ][ −1 ] + 2 ) >> ( 2 + shift1)</add>
        <del>pY[ SubWidthC * x + 1 ][ −1 ] + 2 ) >> 2 </del>

5. When numSampL is greater than 0, the selected neighbouring left chroma samples pSelC[ idx ] are set equal to <ADD>clip3( 0, 1023, p[ −1 ][ pickPosL[ idx − cntT ] ] − offsetCh )</ADD> with idx = cntT..cntT + cntL − 1, and the selected down-sampled neighbouring left luma samples pSelDsY[ idx ] with idx = cntT..cntT + cntL − 1 are derived as follows:
  The variable y is set equal to pickPosL[ idx − cntT ].
  If both SubWidthC and SubHeightC are equal to 1, the following applies:
      <DEL>pSelDsY[ idx ] = pY[ −1 ][ y ]    (365)</DEL>
      <ADD>pSelDsY[ idx ] = pY[ −1 ][ y ] >> shift1 (365)</ADD>
  Otherwise, if SubHeightC is equal to 1, the following applies:

$$pSelDsY[\ idx\ ] = (\ pY[\ -1 - SubWidthC\ ][\ y\ ] +$$
$$2 * pY[\ -SubWidthC\ ][\ y\ ] +$$

(366)

<add>pY[ 1 − SubWidthC ][ y ] + 2 ) >> ( 2 + shift1)</add>
        <del>pY[ 1 − SubWidthC ][ y ] + 2 ) >> 2 </del>
  Otherwise the following applies:
    If sps_chroma_vertical_collocated_flag is equal to 1, the following applies:

$$pSelDsY[\ idx\ ] = (\ pY[\ -SubWidthC\ ][\ SubHeightC * y - 1\ ]$$
$$+$$
$$pY[\ -1 - SubWidthC\ ][\ SubHeightC * y\ ] +$$
$$4 * pY[\ -SubWidthC\ ][\ SubHeightC * y\ ] +$$
$$pY[\ 1 - SubWidthC\ ][\ SubHeightC * y\ ] +$$

(367)

<add>pY[ −SubWidthC ][ SubHeightC * y + 1 ] + 4 ) >> ( 3 + shift1)</add>
      <del>pY[ −SubWidthC ][ SubHeightC * y + 1 ] + 4 ) >> 3 </del>
    Otherwise (sps_chroma_vertical_collocated_flag is equal to 0), the following applies:

$$pSelDsY[\ idx\ ] = (\ pY[\ -1 - SubWidthC\ ][\ SubHeightC * y\ ]$$
$$+$$
$$pY[\ -1 - SubWidthC\ ][\ SubHeightC * y + 1\ ] +$$
$$2 * pY[\ -SubWidthC\ ][\ SubHeightC * y\ ] +$$
$$2 * pY[\ -SubWidthC\ ][\ SubHeightC * y + 1\ ] +$$
$$pY[\ 1 - SubWidthC\ ][\ SubHeightC * y\ ] +$$

(368)

<add>pY[ 1 − SubWidthC] [ SubHeightC * y + 1 ] + 4 ) >> ( 3 + shift1)</add>
      <del>pY[ 1 − SubWidthC][ SubHeightC * y + 1 ] + 4) >> 3 </del>

6. The variables minY, maxY, minC and maxC are derived as follows:
  When cntT + cntL is equal to 2, pSelComp[ 3 ] is set equal to pSelComp[ 0 ], pSelComp[ 2 ] is set equal to pSelComp[ 1 ], pSelComp[ 0 ] is set equal to pSelComp[ 1 ], and pSelComp[ 1 ] is set equal to pSelComp[ 3 ], with Comp being replaced by DsY and C.
  The arrays minGrpIdx and maxGrpIdx are derived as follows:
    minGrpIdx[ 0 ] = 0        (369)
    minGrpIdx[ 1 ] = 2        (370)
    maxGrpIdx[ 0 ] = 1        (371)
    maxGrpIdx[ 1 ] = 3        (372)
  When pSelDsY[ minGrpIdx[ 0 ] ] is greater than pSelDsY[ minGrpIdx[ 1 ] ], minGrpIdx[ 0 ] and minGrpIdx[ 1 ] are swapped as follows:
    ( minGrpIdx[ 0 ], minGrpIdx[ 1 ] ) = Swap( minGrpIdx[ 0 ], minGrpIdx[ 1 ] )  (373)
  When pSelDsY[ maxGrpIdx[ 0 ] ] is greater than pSelDsY[ maxGrpIdx[ 1 ] ], maxGrpIdx[ 0 ] and maxGrpIdx[ 1 ] are swapped as follows:
    ( maxGrpIdx[ 0 ], maxGrpIdx[ 1 ] ) = Swap( maxGrpIdx[ 0 ], maxGrpIdx[ 1 ] )  (374)
  When pSelDsY[ minGrpIdx[ 0 ] ] is greater than pSelDsY[ maxGrpIdx[ 1 ] ], arrays minGrpIdx and maxGrpIdx are swapped as follows:
    ( minGrpIdx, maxGrpIdx ) = Swap( minGrpIdx, maxGrpIdx )  (375)

8.4.5.2.14 Specification of INTRA_LT_CCLM, INTRA_L_CCLM and INTRA_T_CCLM intra prediction mode When pSelDsY[ minGrpIdx[ 1 ] ] is greater than pSelDsY[ maxGrpIdx[ 0 ] ],
minGrpIdx[ 1 ] and maxGrpIdx[ 0 ] are swapped as follows:
$$( \text{minGrpIdx}[ 1 ], \text{maxGrpIdx}[ 0 ] ) = \text{Swap}( \text{minGrpIdx}[ 1 ], \text{maxGrpIdx}[ 0 ] ) \tag{376}$$

The variables maxY, maxC, minY and minC are derived as follows:
$$\text{maxY} = ( \text{pSelDsY}[ \text{maxGrpIdx}[ 0 ] ] + \text{pSelDsY}[ \text{maxGrpIdx}[ 1 ] ] + 1 ) \gg 1 \tag{377}$$
$$\text{maxC} = ( \text{pSelC}[ \text{maxGrpIdx}[ 0 ] ] + \text{pSelC}[ \text{maxGrpIdx}[ 1 ] ] + 1 ) \gg 1 \tag{378}$$
$$\text{minY} = ( \text{pSelDsY}[ \text{minGrpIdx}[ 0 ] ] + \text{pSelDsY}[ \text{minGrpIdx}[ 1 ] ] + 1 ) \gg 1 \tag{379}$$
$$\text{minC} = ( \text{pSelC}[ \text{minGrpIdx}[ 0 ] ] + \text{pSelC}[ \text{minGrpIdx}[ 1 ] ] + 1 ) \gg 1 \tag{380}$$

7. The variables a, b, and k are derived as follows:
The variable diff is derived as follows:
$$\text{diff} = \text{maxY} - \text{minY} \tag{381}$$
If diff is not equal to 0, the following applies:
$$\text{diffC} = \text{maxC} - \text{minC} \tag{382}$$
$$x = \text{Floor}( \text{Log2}( \text{diff} ) ) \tag{383}$$
$$\text{normDiff} = ( ( \text{diff} \ll 4 ) \gg x ) \& 15 \tag{384}$$
$$x \mathrel{+}= ( \text{normDiff} != 0 ) ? 1 : 0 \tag{385}$$
$$y = \text{Abs}( \text{diffC} ) > 0 ? \text{Floor}( \text{Log2}( \text{Abs} ( \text{diffC} ) ) ) + 1 : 0 \tag{386}$$
$$a = ( \text{diffC} * ( \text{divSigTable}[ \text{normDiff} ] 8 ) + 2^{y-1} ) \gg y \tag{387}$$
$$k = ( ( 3 + x - y ) < 1 ) ? 1 : 3 + x - y \tag{388}$$
$$a = ( ( 3 + x - y ) < 1 ) ? \text{Sign}( a ) * 15 : a \tag{389}$$
$$b = \text{minC} - ( ( a * \text{minY} ) \gg k ) \tag{390}$$
where divSigTable[ ] is specified as follows:
$$\text{divSigTable}[ ] = \{ 0, 7, 6, 5, 5, 4, 4, 3, 3, 2, 2, 1, 1, 1, 1, 0 \} \tag{391}$$
Otherwise (diff is equal to 0), the following applies:
$$k = 0 \tag{392}$$
$$a = 0 \tag{393}$$
$$b = \text{minC} \tag{394}$$

8. The prediction samples predSamples[ x ][ y ] with x = 0..nTbW − 1, y = 0.. nTbH − 1 are derived as follows:
$$\text{predSamples}[ x ][ y ] = \text{Clip1}( ( ( \text{pDsY}[ x ][ y ] * a ) \gg k ) + b \text{<add>} + \text{offsetCh}\text{</add>}) \tag{395}$$

NOTE

This process uses sps_chroma_vertical_collocated_flag. However, in order to simplify implementation, it does not use sps_chroma_horizontal_collocated_flag.

Figure 6:
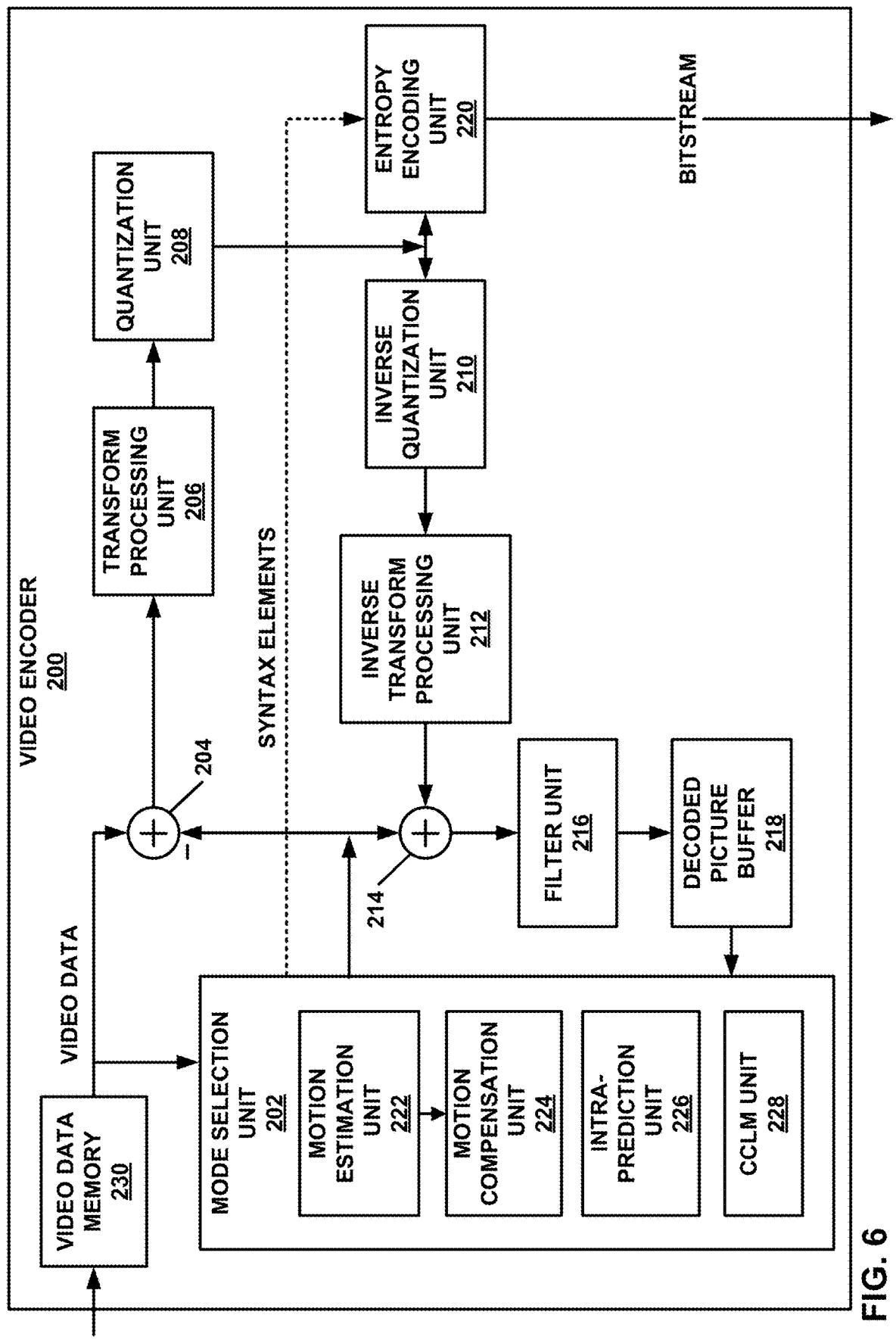
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, an intra-prediction unit 226, and a CCLM unit 228. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block. For intra-predicted blocks, CCLM unit 228 may predict a chroma component for the block using CCLM mode. As described in this disclosure, CCLM unit 228 may, for example, be configured to encode a first block having a first bitdepth and a second block having a second bitdepth in the CCLM mode using a fixed bit depth that is different than at least one of the first bit depth or the second bit depth.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 7:
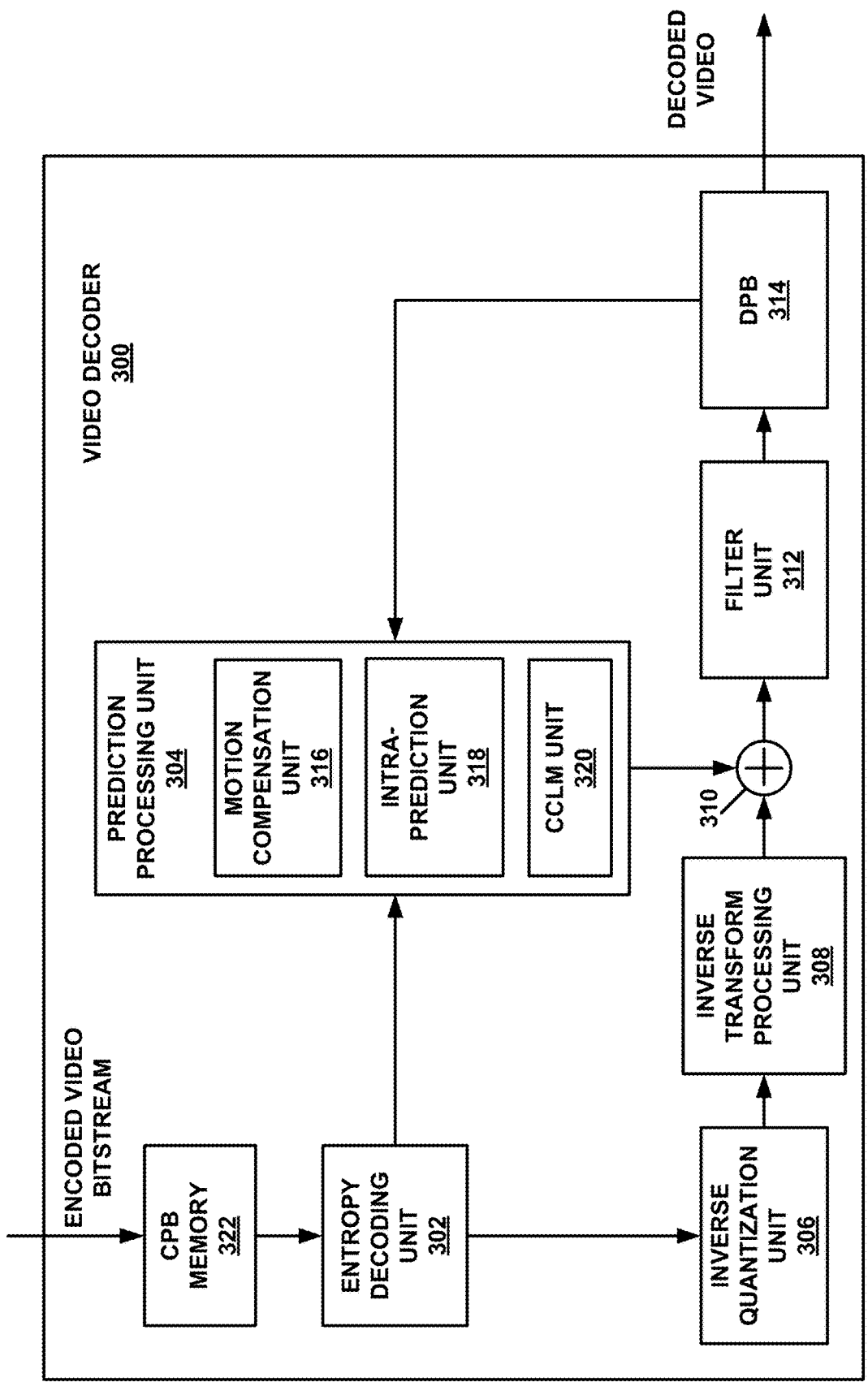
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 7, video decoder 300 includes coded picture buffer (CPB) memory 322, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 322, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316, intra-prediction unit 318, and CCLM unit 320. Prediction processing unit 304 may include additional units to perform prediction in accordance with other prediction modes. As examples, prediction processing unit 304 may include a palette unit, an intra-block copy unit (which may form part of motion compensation unit 316), an affine unit, or the like. In other examples, video decoder 300 may include more, fewer, or different functional components.

CPB memory 322 may store video data, such as an encoded video bitstream, to be decoded by the components of video decoder 300. The video data stored in CPB memory 322 may be obtained, for example, from computer-readable medium 110 (FIG. 1). CPB memory 322 may include a CPB that stores encoded video data (e.g., syntax elements) from an encoded video bitstream. Also, CPB memory 322 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 322 and DPB 314 may be formed by any of a variety of memory devices, such as DRAM, including SDRAM, MRAM, RRAM, or other types of memory devices. CPB memory 322 and DPB 314 may be provided by the same memory device or separate memory devices. In various examples, CPB memory 322 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 322. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314. Regardless of whether a luma component of a block is inter- or intra-predicted, the CCLM unit 320 may predict a chroma component for the block using CCLM mode. As described in this disclosure, CCLM unit 320 may, for example, be configured to decode a first block having a first bitdepth and a second block having a second bitdepth in the CCLM mode using a fixed bit depth that is different than at least one of the first bit depth or the second bit depth.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 8:
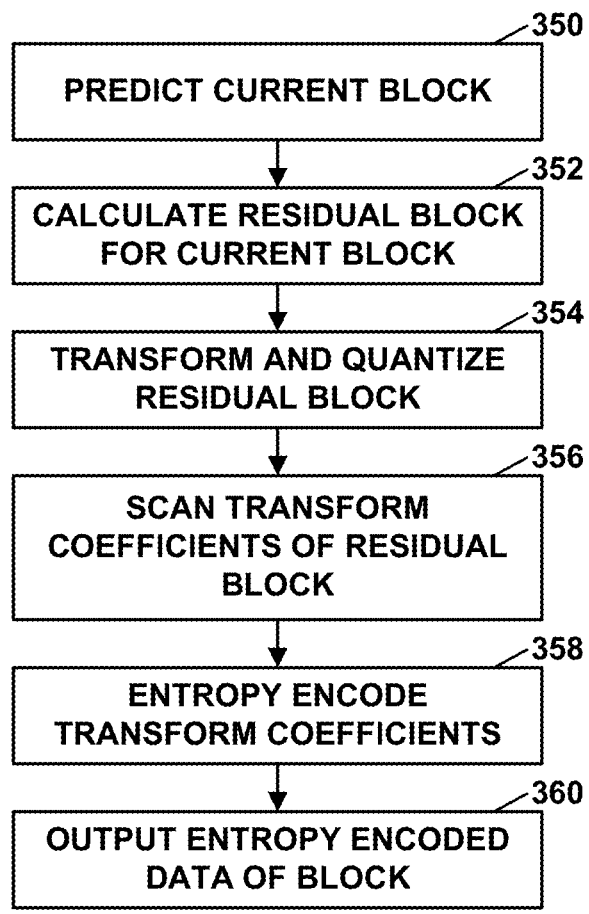
FIG. 8 is a flowchart illustrating an example process for encoding a current block in accordance with the techniques of this disclosure.

FIG. 8 is a flowchart illustrating an example process for encoding a current block in accordance with the techniques of this disclosure. The current block may comprise a current CU. Although described with respect to video encoder 200 (FIGS. 1 and 6), it should be understood that other devices may be configured to perform a process similar to that of FIG. 8.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 9:
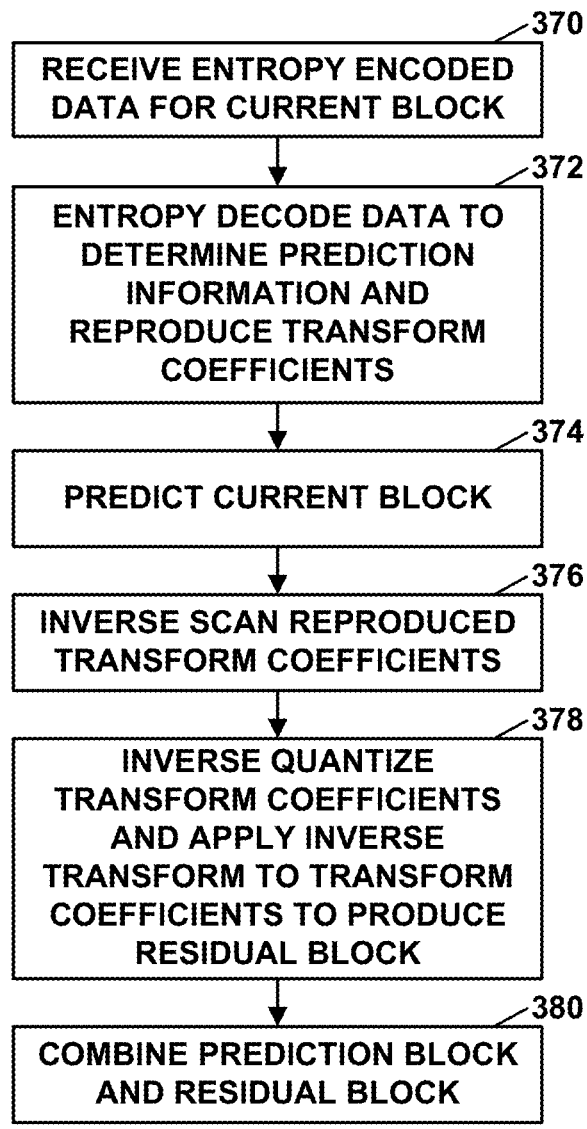
FIG. 9 is a flowchart illustrating an example process for decoding a current block in accordance with the techniques of this disclosure.

FIG. 9 is a flowchart illustrating an example process for decoding a current block of video data in accordance with the techniques of this disclosure. The current block may comprise a current CU. Although described with respect to video decoder 300 (FIGS. 1 and 7), it should be understood that other devices may be configured to perform a process similar to that of FIG. 9.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 10:
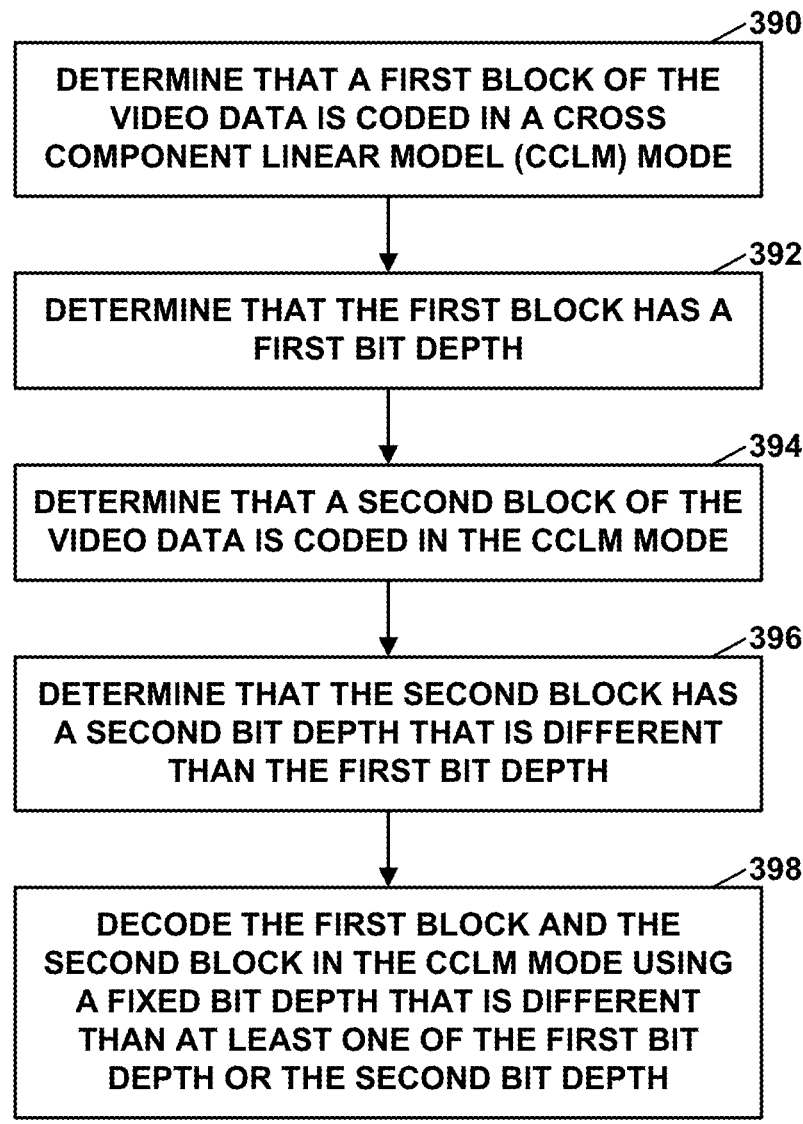
FIG. 10 is a flowchart illustrating an example process for decoding a current block in accordance with the techniques of this disclosure.

FIG. 10 is a flowchart illustrating an example process for decoding a current block of video data in accordance with the techniques of this disclosure. The current block may comprise a current CU. Although described with respect to video decoder 300 (FIGS. 1 and 7), it should be understood that other devices may be configured to perform a process similar to that of FIG. 10. For example, the decoding loop of video encoder 200 may be configured to perform the process of FIG. 10.

In the example of FIG. 10, video decoder 300 determines that a first block of the video data is coded in a CCLM mode (390). Video decoder 300 determines that the first block has a first bit depth (392). The first depth may, for instance, be any of 8, 10, 12, or any other bit depth. Video decoder 300 determines that a second block of the video data is coded in the CCLM mode (394). Video decoder 300 determines that the second block has a second bit depth that is different than the first bit depth (396).

Video decoder 300 decodes the first block and the second block in the CCLM mode using a fixed bit depth that is different than at least one of the first bit depth or the second bit depth (398). To decode the first block and the second block in the CCLM mode using the fixed bit depth, video decoder 300 may upsample or downsample prediction samples of the first or second block to the fixed bit depth.

In some examples, the first bit depth may be greater than 10 bits, and the fixed bit depth may be 10 bits. In some examples, the first bit depth may be equal to 10 bits, the second bit depth equal to 8 bits, and the fixed bit depth equal to 10 bits. In some examples, the fixed bit depth may be equal to the first bit depth and different than the second bit depth, or vice versa.

To decode the first block and the second block in the CCLM mode using the fixed bit depth, video decoder 300 may, for example, determine a luma block of the first block, the luma block being at the first bit depth; downsample the luma block of the first block to the fixed bit depth to determine an intermediate luma block, wherein the intermediate luma block is at the fixed bit depth; derive CCLM parameters based on the intermediate luma block; derive an intermediate chroma block based on the CCLM parameters, the intermediate luma block, and a neighboring intermediate luma block; and upsample the intermediate chroma block to determine a final chroma block, wherein the final chroma block is at the first bit depth.

The luma block of the first block may be a reconstructed luma block, and the final chroma block may be a prediction chroma block. To decode the first block and the second block in the CCLM mode using the fixed bit depth, video decoder 300 may additionally determine a residual chroma block; add the residual chroma block to the final chroma block to determine a reconstructed chroma block; and output decoded video data based on the reconstructed chroma block and the reconstructed luma block.

The following numbered clauses illustrate one or more aspects of the devices and techniques described in this disclosure.

Clause 1. A method of decoding video data, the method comprising: determining that a first block of the video data is encoded in a cross component linear model (CCLM) mode; determining that the first block has a first bit depth; determining that a second block of the video data is encoded in the CCLM mode; determining that the second block has a second bit depth that is different than the first bit depth; and decoding the first block and the second block in the CCLM mode using a fixed bit depth, wherein the fixed bit depth is different than at least one of the first bit depth or the second bit depth.

Clause 2. The method of clause 1, wherein decoding the first block and the second block in the CCLM mode using the fixed bit depth comprises: determining a luma block of the first block, the luma block being at the first bit depth; downsampling the luma block of the first block to the fixed bit depth to determine an intermediate luma block, wherein the intermediate luma block is at the fixed bit depth; deriving CCLM parameters based on the intermediate luma block; deriving an intermediate chroma block based on the CCLM parameters and the intermediate luma block; and upsampling the intermediate chroma block to determine a final chroma block, wherein the final chroma block is at the first bit depth.

Clause 3. The method of clause 2, wherein the luma block of the first block comprises a reconstructed luma block, and wherein the final chroma block comprises prediction chroma block.

Clause 4. The method of clause 3, further comprising: determining a residual chroma block; adding the residual chroma block to the final chroma block to determine a reconstructed chroma block; and outputting decoded video data based on the reconstructed chroma block and the reconstructed luma block.

Clause 5. The method of clause 2, wherein decoding the first block and the second block in the CCLM mode using the fixed bit depth further comprises deriving the CCLM parameters based on the intermediate luma block and a neighboring intermediate luma block, wherein the neighboring intermediate luma block is at the fixed bit depth.

Clause 6. The method of clause 2, wherein the first bit depth is greater than 10 bits and the fixed bit depth is 10 bits.

Clause 7. The method of clause 1, wherein decoding the first block and the second block in the CCLM mode using the fixed bit depth comprises upsampling prediction samples of the second block to the fixed bit depth.

Clause 8. The method of clause 1, wherein decoding the first block and the second block in the CCLM mode using the fixed bit depth comprises downsampling prediction samples of the second block to the fixed bit depth.

Clause 9. The method of clause 1, wherein the fixed bit depth is equal to the first bit depth.

Clause 10. The method of clause 1, wherein the fixed bit depth is equal to 10.

Clause 11. The method of clause 1, wherein the second bit depth is equal to 8.

Clause 12. The method of clause 1, wherein the method of decoding the video data is performed as part of a video encoding process.

Clause 13. A device for decoding video data, the device comprising: a memory configured to store the video data; one or more processors coupled to the memory, implemented in circuitry, and configured to: determine that a first block of the video data is encoded in a cross component linear model (CCLM) mode; determine that the first block has a first bit depth; determine that a second block of the video data is encoded in the CCLM mode; determine that the second block has a second bit depth that is different than the first bit depth; and decode the first block and the second block in the CCLM mode using a fixed bit depth, wherein the fixed bit depth is different than at least one of the first bit depth or the second bit depth.

Clause 14. The device of clause 13, wherein to decode the first block and the second block in the CCLM mode using the fixed bit depth, the one or more processors are configured to: determine a luma block of the first block, the luma block being at the first bit depth; downsample the luma block of the first block to the fixed bit depth to determine an intermediate luma block, wherein the intermediate luma block is at the fixed bit depth; derive CCLM parameters based on the intermediate luma block; derive an intermediate chroma block based on the CCLM parameters and the intermediate luma block; and upsample the intermediate chroma block to determine a final chroma block, wherein the final chroma block is at the first bit depth.

Clause 15. The device of clause 14, wherein the luma block of the first block comprises a reconstructed luma block, and wherein the final chroma block comprises prediction chroma block.

Clause 16. The device of clause 15, wherein the one or more processors are configured to: determine a residual chroma block; add the residual chroma block to the final chroma block to determine a reconstructed chroma block; and output decoded video data based on the reconstructed chroma block and the reconstructed luma block.

Clause 17. The device of clause 14, wherein to decode the first block and the second block in the CCLM mode using the fixed bit depth, the one or more processors are configured to derive the CCLM parameters based on the intermediate luma block and a neighboring intermediate luma block, wherein the neighboring intermediate luma block is at the fixed bit depth.

Clause 18. The device of clause 14, wherein the first bit depth is greater than 10 bits and the fixed bit depth is 10 bits.

Clause 19. The device of clause 13, wherein to decode the first block and the second block in the CCLM mode using the fixed bit depth, the one or more processors are configured to upsample prediction samples of the second block to the fixed bit depth.

Clause 20. The device of clause 13, wherein to decode the first block and the second block in the CCLM mode using the fixed bit depth, the one or more processors are configured to downsample prediction samples of the second block to the fixed bit depth.

Clause 21. The device of clause 13, wherein the fixed bit depth is equal to the first bit depth.

Clause 22. The device of clause 13, wherein the fixed bit depth is equal to 10.

Clause 23. The device of clause 13, wherein the second bit depth is equal to 8.

Clause 24. The device of clause 13, wherein the device is configured to decode the video data as part of a video encoding process.

Clause 25. The device of clause 13, wherein the device comprises a wireless communication device, further comprising a receiver configured to receive encoded video data.

Clause 26. The device of clause 25, wherein the wireless communication device comprises a telephone handset and wherein the receiver is configured to demodulate, according to a wireless communication standard, a signal comprising the encoded video data.

Clause 27. The device of clause 13, further comprising: a display configured to display decoded video data.

Clause 28. The device of clause 13, wherein the device comprises one or more of a camera, a computer, a mobile device, a broadcast receiver device, or a set-top box.

Clause 29. The device of clause 13, wherein the device comprises a wireless communication device, further comprising a transmitter configured to transmit encoded video data.

Clause 30. The device of clause 29, wherein the wireless communication device comprises a telephone handset and wherein the transmitter is configured to modulate, according to a wireless communication standard, a signal comprising the encoded video data.

Clause 31. The device of clause 13, further comprising: a camera configured to capture the video data.

Clause 32. An apparatus for decoding video data, the apparatus comprising: means for determining that a first block of the video data is encoded in a cross component linear model (CCLM) mode; means for determining that the first block has a first bit depth; means for determining that a second block of the video data is encoded in the CCLM mode; means for determining that the second block has a second bit depth that is different than the first bit depth; and means for decoding the first block and the second block in the CCLM mode using a fixed bit depth, wherein the fixed bit depth is different than at least one of the first bit depth or the second bit depth.

Clause 33. A computer-readable storage medium storing instructions that when executed cause one or more processors to: determine that a first block of the video data is coded in a cross component linear model (CCLM) mode; determine that the first block has a first bit depth; determine that a second block of the video data is coded in the CCLM mode; determine that the second block has a second bit depth that is different than the first bit depth; and decode the first block and the second block in the CCLM mode using a fixed bit depth, wherein the fixed bit depth is different than at least one of the first bit depth or the second bit depth.

Clause 34. A method of decoding video data, the method comprising: determining that a first block of the video data is encoded in a cross component linear model (CCLM) mode; determining that the first block has a first bit depth; determining that a second block of the video data is encoded in the CCLM mode; determining that the second block has a second bit depth that is different than the first bit depth; and decoding the first block and the second block in the CCLM mode using a fixed bit depth, wherein the fixed bit depth is different than at least one of the first bit depth or the second bit depth.

Clause 35. The method of clause 34, wherein decoding the first block and the second block in the CCLM mode using the fixed bit depth comprises: determining a luma block of the first block, the luma block being at the first bit depth; downsampling the luma block of the first block to the fixed bit depth to determine an intermediate luma block, wherein the intermediate luma block is at the fixed bit depth; deriving CCLM parameters based on the intermediate luma block; deriving an intermediate chroma block based on the CCLM parameters and the intermediate luma block; and upsampling the intermediate chroma block to determine a final chroma block, wherein the final chroma block is at the first bit depth.

Clause 36. The method of clause 35, wherein the luma block of the first block comprises a reconstructed luma block, and wherein the final chroma block comprises prediction chroma block.

Clause 37. The method of clause 36, further comprising: determining a residual chroma block; adding the residual chroma block to the final chroma block to determine a reconstructed chroma block; and outputting decoded video data based on the reconstructed chroma block and the reconstructed luma block.

Clause 38. The method of clause 35, wherein decoding the first block and the second block in the CCLM mode using the fixed bit depth further comprises deriving the CCLM parameters based on the intermediate luma block and a neighboring intermediate luma block, wherein the neighboring intermediate luma block is at the fixed bit depth.

Clause 39. The method of any of clauses 35-38, wherein the first bit depth is greater than 10 bits and the fixed bit depth is 10 bits.

Clause 40. The method of any of clauses 34-39, wherein decoding the first block and the second block in the CCLM mode using the fixed bit depth comprises upsampling prediction samples of the second block to the fixed bit depth.

Clause 41. The method of any of clauses 34-39, wherein decoding the first block and the second block in the CCLM mode using the fixed bit depth comprises downsampling prediction samples of the second block to the fixed bit depth.

Clause 42. The method of any of clauses 34-38, 40, or 41, wherein the fixed bit depth is equal to the first bit depth.

Clause 43. The method of any of clauses 34-38 or 40-42, wherein the fixed bit depth is equal to 10.

Clause 44. The method of clause 34-38, and 40-43, wherein the second bit depth is equal to 8.

Clause 45. The method of any of clauses 34-44, wherein the method of decoding the video data is performed as part of a video encoding process.

Clause 46. A device for decoding video data, the device comprising: a memory configured to store the video data; one or more processors coupled to the memory, implemented in circuitry, and configured to: determine that a first block of the video data is encoded in a cross component linear model (CCLM) mode; determine that the first block has a first bit depth; determine that a second block of the video data is encoded in the CCLM mode; determine that the second block has a second bit depth that is different than the first bit depth; and decode the first block and the second block in the CCLM mode using a fixed bit depth, wherein the fixed bit depth is different than at least one of the first bit depth or the second bit depth.

Clause 47. The device of clause 46, wherein to decode the first block and the second block in the CCLM mode using the fixed bit depth, the one or more processors are configured to: determine a luma block of the first block, the luma block being at the first bit depth; downsample the luma block of the first block to the fixed bit depth to determine an intermediate luma block, wherein the intermediate luma block is at the fixed bit depth; derive CCLM parameters based on the intermediate luma block; derive an intermediate chroma block based on the CCLM parameters and the intermediate luma block; and upsample the intermediate chroma block to determine a final chroma block, wherein the final chroma block is at the first bit depth.

Clause 48. The device of clause 47, wherein the luma block of the first block comprises a reconstructed luma block, and wherein the final chroma block comprises prediction chroma block.

Clause 49. The device of clause 48, wherein the one or more processors are configured to: determine a residual chroma block; add the residual chroma block to the final chroma block to determine a reconstructed chroma block; and output decoded video data based on the reconstructed chroma block and the reconstructed luma block.

Clause 50. The device of any of clauses 47-49, wherein to decode the first block and the second block in the CCLM mode using the fixed bit depth, the one or more processors are configured to derive the CCLM parameters based on the intermediate luma block and a neighboring intermediate luma block, wherein the neighboring intermediate luma block is at the fixed bit depth.

Clause 51. The device of any of clauses 46-50, wherein the first bit depth is greater than 10 bits and the fixed bit depth is 10 bits.

Clause 52. The device of clause 46-51, wherein to decode the first block and the second block in the CCLM mode using the fixed bit depth, the one or more processors are configured to upsample prediction samples of the second block to the fixed bit depth.

Clause 53. The device of any of clauses 46-51, wherein to decode the first block and the second block in the CCLM mode using the fixed bit depth, the one or more processors are configured to downsample prediction samples of the second block to the fixed bit depth.

Clause 54. The device of any of clauses 46-50, 52, or 53, wherein the fixed bit depth is equal to the first bit depth.

Clause 55. The device of any of clauses 46-50 or 52-54, wherein the fixed bit depth is equal to 10.

Clause 56. The device of any of clauses 46-55, wherein the second bit depth is equal to 8.

Clause 57. The device of any of clauses 46-56, wherein the device is configured to decode the video data as part of a video encoding process.

Clause 58. The device of any of clauses 46-57, wherein the device comprises a wireless communication device, further comprising a receiver configured to receive encoded video data.

Clause 59. The device of any of clauses 58, wherein the wireless communication device comprises a telephone handset and wherein the receiver is configured to demodulate, according to a wireless communication standard, a signal comprising the encoded video data.

Clause 60. The device of any of clauses 46-59, further comprising: a display configured to display decoded video data.

Clause 61. The device of any of clauses 46-60, wherein the device comprises one or more of a camera, a computer, a mobile device, a broadcast receiver device, or a set-top box.

Clause 62. The device of any of clauses 46-61, wherein the device comprises a wireless communication device, further comprising a transmitter configured to transmit encoded video data.

Clause 63. The device of clause 62, wherein the wireless communication device comprises a telephone handset and wherein the transmitter is configured to modulate, according to a wireless communication standard, a signal comprising the encoded video data.

Clause 64. The device of any of clauses 46-63, further comprising: a camera configured to capture the video data.

Clause 65. A method of coding video data, the method comprising: determining that a first block of video data is coded in a cross component linear model (CCLM) mode; determining that the first block has a first bit depth; determining that a second block of video data is coded in the CCLM mode; determining that the second block has a second bit depth that is different than the first bit depth; and coding the first block and the second block in the CCLM mode using a fixed bit depth, wherein the fixed bit depth is different than at least one of the first bit depth or the second bit depth.

Clause 66. The method of clause 65, wherein coding the first block and the second block in the CCLM mode using the fixed bit depth comprises upsampling prediction samples of the second block to the fixed bit depth.

Clause 67. The method of clause 65, wherein coding the first block and the second block in the CCLM mode using the fixed bit depth comprises downsampling prediction samples of the second block to the fixed bit depth.

Clause 68. The method of any of clauses 65-67, wherein the fixed bit depth is equal to the first bit depth.

Clause 69. The method of any of clauses 65-68, wherein the fixed bit depth is equal to 10.

Clause 70. The method of any of clauses 65-69, wherein the second bit depth is equal to 8.

Clause 71. The method of any of clauses aims 65-70, wherein coding comprises decoding.

Clause 72. The method of any of clauses 65-70, wherein coding comprises encoding.

Clause 73. A device for coding video data, the device comprising one or more means for performing the method of any of clauses 65-72.

Clause 74. The device of clause 73, wherein the one or more means comprise one or more processors implemented in circuitry.

Clause 75. The device of any of clauses 73 and 74, further comprising a memory to store the video data.

Clause 76. The device of any of clauses 73-75, further comprising a display configured to display decoded video data.

Clause 77. The device of any of clauses 73-76, wherein the device comprises one or more of a camera, a computer, a mobile device, a broadcast receiver device, or a set-top box.

Clause 78. The device of any of clauses 73-77, wherein the device comprises a video decoder.

Clause 79 The device of any of clauses 73-78, wherein the device comprises a video encoder.

Clause 80. A computer-readable storage medium having stored thereon instructions that, when executed, cause one or more processors to perform the method of any of clauses 65-70.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining that a first block of the video data is encoded in a cross component linear model (CCLM) mode;
    determining that sample values of the first block have a first bit depth;
    determining a luma block of the first block, samples values of the luma block being at the first bit depth;
    performing CCLM decoding for the first block at a fixed bit depth that is different than the first bit depth, wherein performing the CCLM decoding for the first block at the fixed bit depth comprises:
        performing a first shift operation on the sample values of the luma block to determine an intermediate luma block, wherein sample values of the intermediate luma block are at the fixed bit depth;
        deriving CCLM parameters based on a neighboring intermediate luma block, sample values of the neighboring intermediate luma block being at the fixed bit depth;
        deriving an intermediate chroma block based on the CCLM parameters and the intermediate luma block, wherein sample values of the intermediate chroma block are at the fixed bit depth;
        performing a second shift operation on sample values of the intermediate chroma block to determine a final chroma block, wherein sample values of the final chroma block are at the first bit depth; and
    outputting a picture of decoded video data at the first bit depth, wherein the picture of decoded video data includes a decoded version of the first block and the decoded version of the first block includes the sample values of the final chroma block and the sample values of the luma block.

2. The method of claim 1, wherein the luma block of the first block comprises a reconstructed luma block, and wherein the final chroma block comprises prediction chroma block.

3. The method of claim 2, further comprising:
    determining a residual chroma block;
    adding the residual chroma block to the final chroma block to determine a reconstructed chroma block; and outputting the picture of decoded video data based on the reconstructed chroma block and the reconstructed luma block.

4. The method of claim 1, wherein the first bit depth is greater than 10 bits and the fixed bit depth is 10 bits.

5. The method of claim 1, wherein the fixed bit depth is equal to 10.

6. The method of claim 1, wherein the method of decoding the video data is performed as part of a video encoding process.

7. A device for decoding video data, the device comprising:
a memory configured to store the video data;
one or more processors coupled to the memory, implemented in circuitry, and configured to:
determine that a first block of the video data is encoded in a cross component linear model (CCLM) mode;
determine that sample values of the first block have a first bit depth;
determine a luma block of the first block, samples values of the luma block being at the first bit depth;
perform CCLM decoding for the first block at a fixed bit depth that is different than the first bit depth, wherein to perform the CCLM decoding for the first block at the fixed bit depth, the one or more processors are further configured to:
perform a first shift operation on the sample values of the luma block to determine an intermediate luma block, wherein sample values of the intermediate luma block are at the fixed bit depth;
derive CCLM parameters based on a neighboring intermediate luma block, sample values of the neighboring intermediate luma block being at the fixed bit depth;
derive an intermediate chroma block based on the CCLM parameters and the intermediate luma block, wherein sample values of the intermediate chroma block are at the fixed bit depth;
perform a second shift operation on sample values of the intermediate chroma block to determine a final chroma block, wherein sample values of the final chroma block are at the first bit depth; and
output a picture of decoded video data at the first bit depth, wherein the picture of decoded video data includes a decoded version of the first block and the decoded version of the first block includes the sample values of the final chroma block and the sample values of the luma block.

8. The device of claim 7, wherein the luma block of the first block comprises a reconstructed luma block, and wherein the final chroma block comprises prediction chroma block.

9. The device of claim 8, wherein the one or more processors are configured to:
determine a residual chroma block;
add the residual chroma block to the final chroma block to determine a reconstructed chroma block; and
output the picture of decoded video data based on the reconstructed chroma block and the reconstructed luma block.

10. The device of claim 7, wherein the first bit depth is greater than 10 bits and the fixed bit depth is 10 bits.

11. The device of claim 7, wherein the fixed bit depth is equal to 10.

12. The device of claim 7, wherein the device is configured to decode the video data as part of a video encoding process.

13. The device of claim 7, wherein the device comprises a wireless communication device, further comprising a receiver configured to receive encoded video data.

14. The device of claim 13, wherein the wireless communication device comprises a telephone handset and wherein the receiver is configured to demodulate, according to a wireless communication standard, a signal comprising the encoded video data.

15. The device of claim 7, further comprising a display configured to display decoded video data.

16. The device of claim 7, wherein the device comprises one or more of a camera, a computer, a mobile device, a broadcast receiver device, or a set-top box.

17. The device of claim 7, wherein the device comprises a wireless communication device, further comprising a transmitter configured to transmit encoded video data.

18. The device of claim 17, wherein the wireless communication device comprises a telephone handset and wherein the transmitter is configured to modulate, according to a wireless communication standard, a signal comprising the encoded video data.

19. The device of claim 7, further comprising a camera configured to capture the video data.

20. An apparatus for decoding video data, the apparatus comprising:
means for determining that a first block of the video data is encoded in a cross component linear model (CCLM) mode;
means for determining that sample values of the first block have a first bit depth;
means for determining a luma block of the first block, samples values of the luma block being at the first bit depth;
means for performing CCLM decoding for the first block at a fixed bit depth that is different than the first bit depth, wherein the means for performing the CCLM decoding for the first block at the fixed bit depth comprises:
means for performing a first shift operation on the sample values of the luma block to determine an intermediate luma block, wherein sample values of the intermediate luma block are at the fixed bit depth;
means for deriving CCLM parameters based on a neighboring intermediate luma block, sample values of the neighboring intermediate luma block being at the fixed bit depth;
means for deriving an intermediate chroma block based on the CCLM parameters and the intermediate luma block, wherein sample values of the intermediate chroma block are at the fixed bit depth;
means for performing a second shift operation on sample values of the intermediate chroma block to determine a final chroma block, wherein sample values of the final chroma block are at the first bit depth; and
means for outputting a picture of decoded video at the first bit depth, wherein the picture of decoded video data includes a decoded version of the first block and the decoded version of the first block includes the sample values of the final chroma block and the sample values of the luma block.

21. A non-transitory, computer-readable storage medium storing instructions that when executed cause one or more processors to:
determine that a first block of video data is encoded in a cross component linear model (CCLM) mode;

determine that sample values of the first block have a first bit depth;

determine a luma block of the first block, samples values of the luma block being at the first bit depth;

perform CCLM decoding for the first block at a fixed bit depth that is different than the first bit depth, wherein performing the CCLM decoding for the first block at the fixed bit depth comprises:

perform a first shift operation on the sample values of the luma block to determine an intermediate luma block, wherein sample values of the intermediate luma block are at the fixed bit depth;

derive CCLM parameters based on a neighboring intermediate luma block, sample values of the neighboring intermediate luma block being at the fixed bit depth;

derive an intermediate chroma block based on the CCLM parameters and the intermediate luma block, wherein sample values of the intermediate chroma block are at the fixed bit depth;

perform a second shift operation on sample values of the intermediate chroma block to determine a final chroma block, wherein sample values of the final chroma block are at the first bit depth; and output a picture of decoded video at the first bit depth, wherein the picture of decoded video data includes a decoded version of the first block and the decoded version of the first block includes the sample values of the final chroma block and the sample values of the luma block.

22. The method of claim 1, wherein the first shift operation comprises a right shift and the second shift operation comprises a left shift.

23. The method of claim 1, wherein the first shift operation comprises a left shift and the second shift operation comprises a right shift.

24. The device of claim 7, wherein the first shift operation comprises a right shift and the second shift operation comprises a left shift.

25. The device of claim 7, wherein the first shift operation comprises a left shift and the second shift operation comprises a right shift.

26. The method of claim 1, wherein the first shift operation comprises downsampling.

27. The device of claim 7, wherein the first shift operation comprises downsampling.

* * * * *